United States Patent [19]

Hahn et al.

[11] Patent Number: 5,751,287
[45] Date of Patent: May 12, 1998

[54] SYSTEM FOR ORGANIZING DOCUMENT ICONS WITH SUGGESTIONS, FOLDERS, DRAWERS, AND CABINETS

[75] Inventors: Samuel S. Hahn, Saratoga; Kenn LeGault, San Francisco; Maxon Wheeler, San Jose; Jon R. Degenhardt, Mountain View, all of Calif.

[73] Assignee: Documagix, Inc., San Jose, Calif.

[21] Appl. No.: 554,052

[22] Filed: Nov. 6, 1995

[51] Int. Cl.[6] .................................................. G06F 3/00
[52] U.S. Cl. .................................................. 345/351
[58] Field of Search .................................. 345/326–358

[56] References Cited

U.S. PATENT DOCUMENTS

| | | | |
|---|---|---|---|
| 4,601,003 | 7/1986 | Yoneyama et al. | 395/351 |
| 5,065,347 | 11/1991 | Pajak et al. | 395/349 |
| 5,107,443 | 4/1992 | Smith et al. | 395/348 X |
| 5,140,678 | 8/1992 | Torres | 395/349 |
| 5,283,864 | 2/1994 | Knowlton | 395/350 |
| 5,305,435 | 4/1994 | Bronson | 395/349 |
| 5,347,628 | 9/1994 | Brewer et al. | 395/351 |
| 5,349,658 | 9/1994 | ORourke et al. | 395/351 |
| 5,442,795 | 8/1995 | Levine et al. | 395/351 X |

*Primary Examiner*—John E. Breene
*Attorney, Agent, or Firm*—Townsend and Townsend and Crew LLP

[57] ABSTRACT

A user interface providing a cabinet, drawers, folders and documents for manipulating and organizing the documents. An image of a file cabinet is used where the user can create, name, describe, lock and position the drawer within a space in the file cabinet. Each drawer can be marked with a graphic icon for easier visual identification. The drawer, and drawer text, can also be colored. When a drawer is selected it "opens" and to show file folders within the drawer in or more windows on the screen. The folders can similarly be named, described and keyed with a color. Each file folder is shown having a label tab with a name on the label tab. The label tabs are visible even when multiple folders are shown on the within a window. When a folder is opened, documents within that folder are shown in thumbnail size in an open-folder window. Suggestions may be given to associated documents with file folders.

16 Claims, 34 Drawing Sheets

SYSTEM FOR ORGANIZING DOCUMENT ICONS WITH SUGGESTIONS, FOLDERS, DRAWERS, AND CABINETS

BACKGROUND OF THE INVENTION

This invention relates generally to user interfaces in computer systems and specifically to a graphical user interface for organizing and manipulating documents in a computer system.

A major use of computer systems today is for organizing and manipulating documents. Typical documents can contain text, data, scanned images, applications, executable code, sounds, movies, etc. To facilitate this use, the user must be able to store and retrieve such documents quickly and efficiently. Naturally, this task becomes more complicated when the number of documents is large and the types of documents are varied.

Recently, the graphical user interface (GUI) has provided a more efficient way for the user to organize documents. As will be described below however, current GUIs have drawbacks that restrict the user's flexibility and ability to perform tasks efficiently.

FIG. 1A illustrates a typical graphical user interface for manipulating documents. FIG. 1A illustrates a partial screen display 10 of a Macintosh computer running the System 7 operating system, both from Apple Computer, Inc. Screen display 10 includes a cursor 20, icons representing folders such as System Folder 30, Word 40 and System 50, windows such as window 60 and 70, document icons such as text file 80, file 90, and font 110.

A user operates the graphical user interface by typically using a mouse, or other pointing device, to control a cursor, shown at 20, to select, or "click on," icons such as System Folder 30 in a manner well-known in the art. Here, when System Folder 30 has been selected, window 60 appears on screen display 10. Window 60 includes additional icons in the shape of folders, such as System 50, and documents such as document 90. Here, when the user clicks on System 50, window 70 appears. As shown, Window 70 includes documents representing type faces such as font 100.

Icons, representing folders or documents, may be moved within the various windows by clicking upon a particular icon, dragging the icon to a destination window, and dropping the icon in the destination window. For example, text file 80 can be moved into Word 40 folder by clicking on text file 80 icon, dragging text file 80 icon on top of Word 40 folder, and dropping text file 80 icon on top of Word 40 folder.

Under the Macintosh operating system, icons can be in the shape of folders or documents, etc. The shapes of icons are often used to help the user organize documents. The operating system also allows icons to be labeled with a name, typically immediately below the icon, allows the icons to have different shapes, and allows the icons to have additional ornamentation to provide a visual indication of what the icon represents.

One drawback of the Macintosh operating system is that icons can be arbitrarily positioned on the screen. When there are many icons on the screen, often the screen becomes cluttered and is difficult to read.

Another drawback is that the operating system allows the user to arbitrarily place icons in virtually any window. As illustrated in FIG. 1A, window 60 and screen display 10 contain folders, documents and other icons all together, making it difficult for the user to conceptualize a document hierarchy. Because the operating system uses a scheme that is different from the way users typically use and organize documents, such a scheme is not intuitive to users, especially novice users.

Figs. 1B and 1C illustrates another typical graphical user interface for manipulating documents. Figs. 1B and 1C illustrate a partial screen display 120 and 130 under Microsoft Windows 3.1 by Microsoft, Inc.

In FIG. 1B, screen display 120 includes windows such as window 140 and icons such as icon 150 and 160. Under Microsoft Windows, icons have a generic "menu" depictions such as icon 150, although custom icons can also be used. Here window 140 includes icons including a file cabinet icon 160. The function associated with file cabinet icon 160 allows the user to manipulate and organize files under Windows.

In Fig. 1C, partial screen display 130 is presented to the user in response to the selection of file cabinet icon 160. Partial screen display 130 includes a left portion 180, a right portion 190, open folder 200 icon, folder 210 icon, and document 220 icon.

Left portion 180 illustrates file folders in a directory "tree" structure; and the right portion 190 illustrates the contents of a selected file folder 200 in left portion 180. When selected, the selected folder icon is highlighted and open folder 200 icon replaces the original icon. The contents of open folder 200 icon are shown in right portion 190 and include folders such as images 210 and documents such as pcbkmark.zip 220.

Drawbacks of the Microsoft Windows user interface are similar to the drawbacks of the Macintosh user interface. Specifically, since icons can be arbitrarily positioned on the screen, when there are many icons on the screen, often the screen becomes cluttered and is difficult to read. Further, as illustrated in Fig. 1C, windows can contain a mix of folders, documents and other icons all together, making it difficult for the user to conceptualize a document hierarchy. Again, because the operating system uses a scheme that is different from the way users typically use and organize documents, such a scheme is not intuitive to users, especially novice users.

What is needed is a graphical user interface that provides the user an easy and efficient system for manipulating and organizing documents in a computer system.

SUMMARY OF THE INVENTION

The invention provides a user interface that presents document organization in terms of objects that the user already understands such as a file cabinet, file drawers, file folders and documents. Because objects in the user interface contain subsequent objects much like their physical counterparts, the learning time required by novice users is decreased and the user interface is more intuitive.

According to one embodiment of the present invention, a method for managing documents in a computer system includes the steps of displaying a file cabinet image on the display, the file cabinet image including a plurality of file drawer images, and selecting a file drawer image from the plurality of file drawer images in response to a first plurality of signals from a user input device. The method also includes displaying a plurality of file folder images associated with the file drawer image on the display.

According to another embodiment of the present invention, an apparatus for managing documents in a computer system, the computer system including a user input device coupled to a processor, and a memory having a plurality of documents, also includes a display, a machine configured to display a file cabinet image on the display, the file cabinet image including a plurality of file drawer images, and a machine configured to select a file drawer image from the plurality of file drawer images in response to a first plurality of signals from the user input device. The apparatus also includes a machine configured to display a plurality of file folder images associated with the file drawer image on the display.

According to yet another embodiment of the present invention, a computer program for managing documents in a computer system, the computer system including a user input device coupled to a processor, a display, and a memory having a plurality of documents, includes code that displays a file cabinet image on the display, the file cabinet image including a plurality of file drawer images, code that enables the user to select a file drawer image from the plurality of file drawer images in response to a first plurality of signals from the user input device, and code that displays a plurality of file folder images associated with the file drawer image on the display. These codes are stored in a tangible medium.

DESCRIPTION OF THE PREFERRED EMBODIMENT

The preferred embodiment of the present invention displays an image of a file cabinet on the display. The file cabinet image is a metaphor for a physical file cabinet. The file cabinet image typically includes more than one file drawer image and (optionally) file drawer opening image, in much the same way a physical file cabinet includes physical file drawers and empty openings.

The file drawer images are metaphors for physical file drawers. In response to the user selecting a particular file drawer image, the contents of the particular file drawer image are displayed to the user in much the same way the contents of a physical file drawer are displayed when opened. Typical contents of file drawer images are file folder images.

File folder images are metaphors for physical file folders. In response to the user selecting a particular file folder image, the contents of the particular file folder image are displayed to the user in much the same way the contents of a physical file folder are displayed when opened. Typical contents of file folder images are document icons.

Document icons are metaphors for physical documents. In response to the user selecting a particular document icon, the document is displayed to the user in much the same way the contents of a document are displayed. Preferably, documents contained herein include text or images, however other types of documents are also contemplated, such as sounds.

The organizational scheme of the preferred embodiment of the present invention, described below, attempts to present an interface to the user for organizing and manipulating documents in a manner that the user already quite familiar with, a physical file cabinet. By doing so, the expected learning curve for the present system is believed to be low and the expected increase in efficiency of the user is believed to be high.

Figure 2:
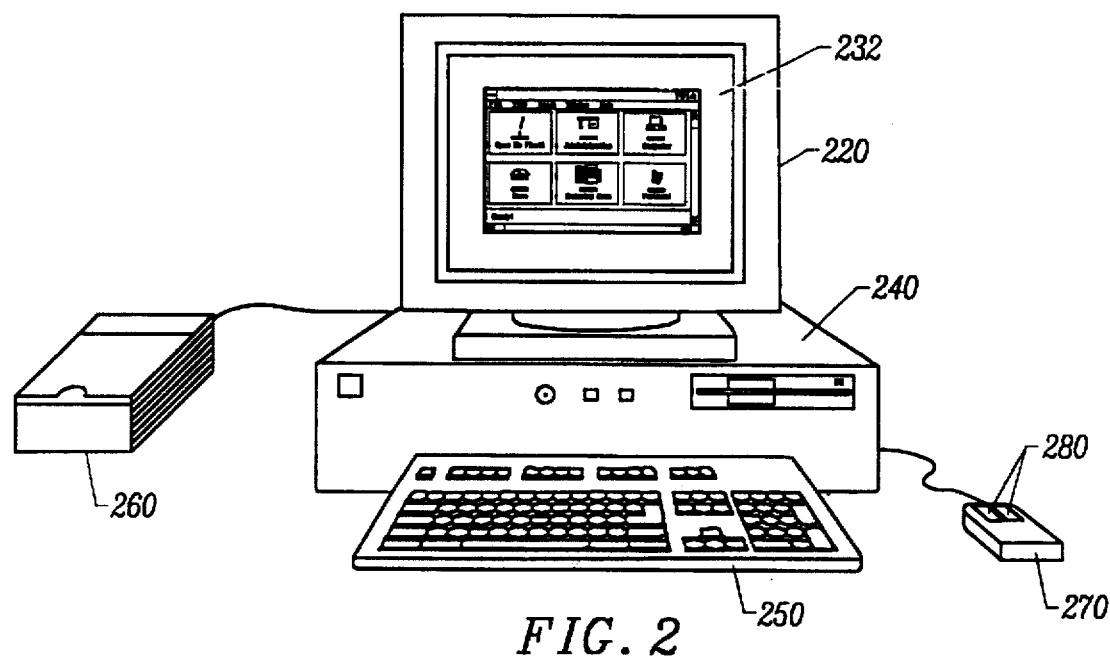
FIG. 2 is an illustration of a system according to a preferred embodiment of the present invention.

FIG. 2 is an illustration of a system according to a preferred embodiment of the present invention. FIG. 2 depicts but one example of many possible computer types or configurations capable of being used with the present invention. FIG. 2 shows computer system 210 including display device 220, display screen 230, cabinet 240, keyboard 250, a scanner 260, and mouse 270. Mouse 270 and keyboard 250 illustrate "user input devices." Other examples of user input devices are a touch screen, light pen, track ball, data glove, etc.

In a preferred embodiment, System 1 includes a Pentium® class based computer, running Windows® Version 3.1 or Windows95® operating system by Microsoft Corporation, and PaperMaster® from DocuMagix Incorporated. The majority of the figures below are illustrated under the Windows 3.1 operating system, the figures may appear slightly different under the Windows95 operating system.

Mouse 270 may have one or more buttons such as buttons 280. Cabinet 240 houses familiar computer components such as disk drives, a processor, storage means, etc. As used in this specification "storage means" includes any storage device used in connection with a computer system such as disk drives, magnetic tape, solid state memory, bubble memory, etc. Cabinet 240 may include additional hardware such as input/output (I/O) interface cards for connecting computer system 210 to external devices such as a scanner 260, external storage, other computers or additional peripherals.

FIG. 2 is representative of but one type of system for embodying the present invention. It will be readily apparent to one of ordinary skill in the art that many system types and configurations are suitable for use in conjunction with the present invention.

Figure 3:
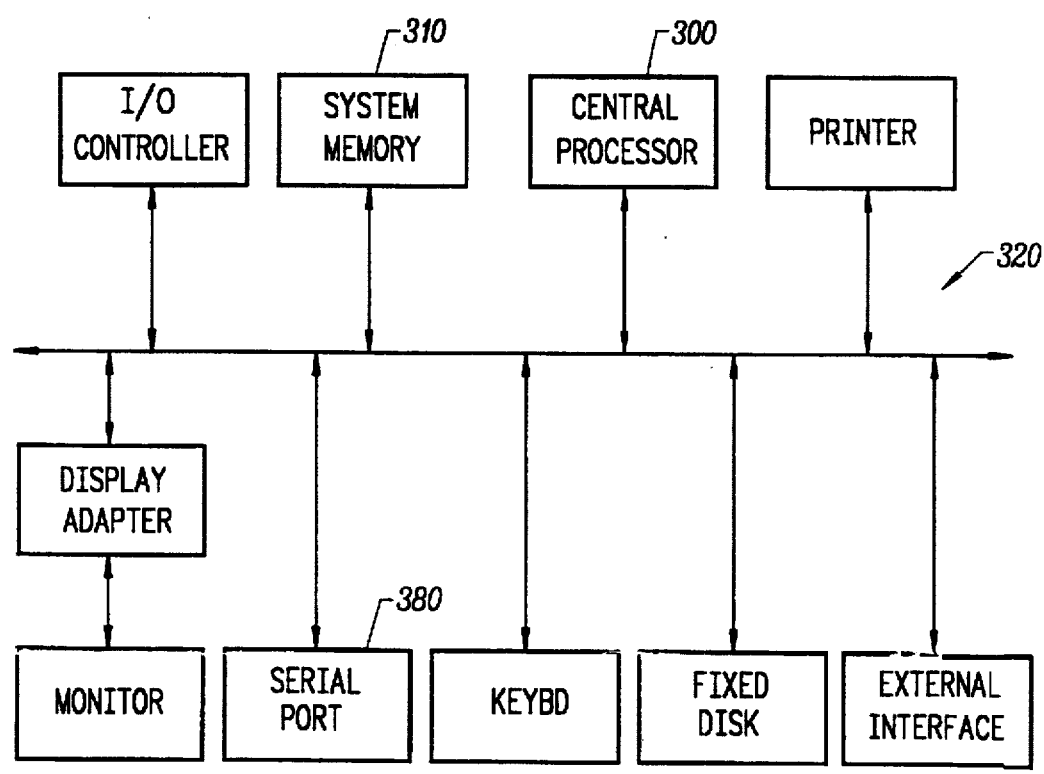
FIG. 3 is an illustration of basic subsystems the system of FIG. 2.

FIG. 3 is an illustration of basic subsystems in computer system 210 of FIG. 2. In FIG. 3, subsystems are represented by blocks such as central processor 300, system memory 310, etc. The subsystems are interconnected via a system bus 320. Additional subsystems such as a printer, keyboard, fixed disk and others are shown. Peripherals and input/output (I/O) devices can be connected to the computer system by, for example serial port 330. For example, serial port 330 can be used to connect the computer system to a modem, a mouse input device, or a scanner. The interconnection via system bus 320 allows central processor 300 to communicate with each subsystem and to control the execution of instructions from system memory 310 or the fixed disk, and the exchange of information between subsystems. Other arrangements of subsystems and interconnections are possible. System Memory 310, and the fixed disk are examples of tangible media for storage of computer programs, other types of tangible media include floppy disks, removable hard disks, optical storage media such as CD-ROMS and bar codes, and semiconductor memories such as flash memory, read-only-memories (ROMS), and battery backed memory.

Figure 4:
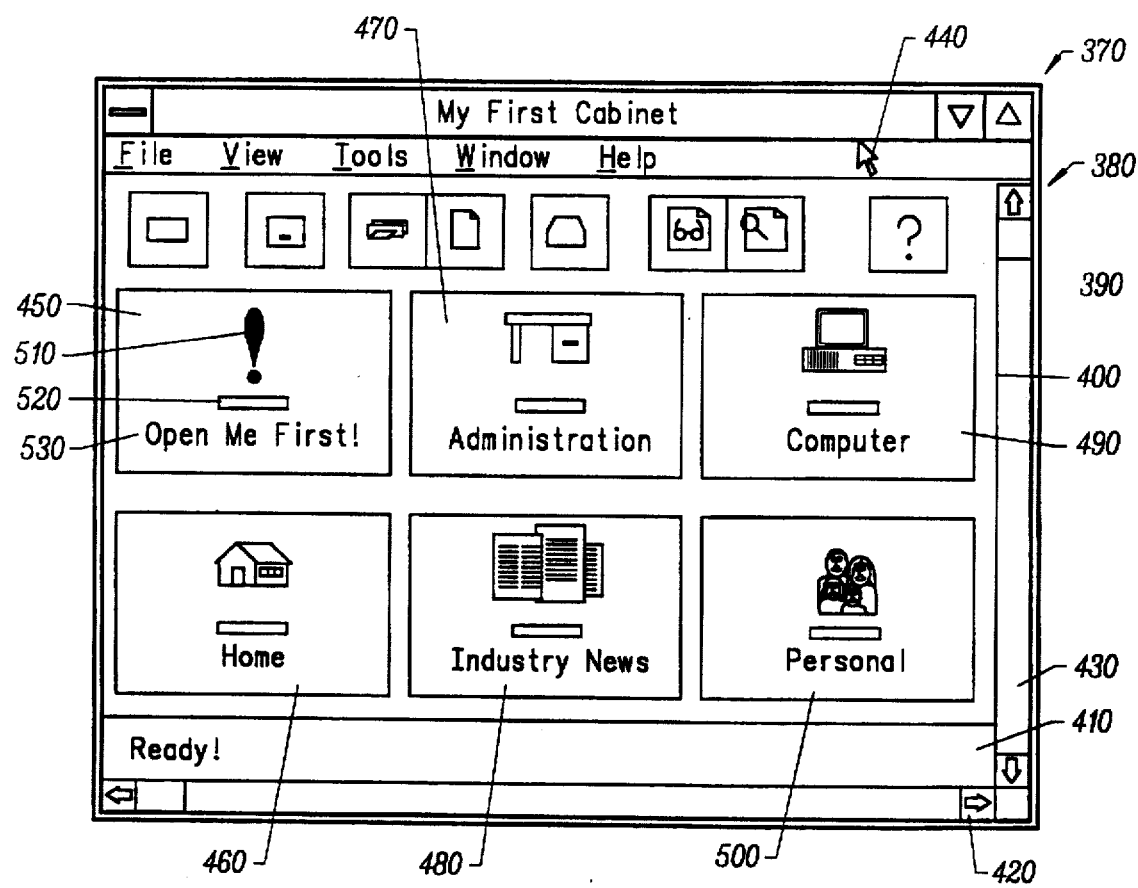
FIG. 4 illustrates a screen display according to a preferred embodiment of the present invention.

FIG. 4 illustrates a screen display 370 according to a preferred embodiment of the present invention. Screen display 370 includes a menu bar 380, a plurality of tool bar buttons 390, a "file cabinet" having a visible portion 400, a status bar 410, a horizontal scroll bar 420 and a vertical scroll bar 430. Active file cabinet area 400 includes file drawer images 450–500. Each file drawer image includes an icon, a drawer handle, and a text name field. For example, file drawer image 450, includes icon 510, drawer handle 520, and text field 530.

A cursor 440 is manipulated by the mouse (not shown) to select, position, activate and otherwise manipulate the images on the screen. As illustrated in FIG. 4, file drawer images 450–500 are displayed in a visible portion 400 of a file cabinet. Other file drawer images may exist in the file cabinet and may be displayed to the user through conventional scrolling of the visible portion 400 with horizontal scroll bar 420 and vertical scroll bar 430. As will be described later, the file cabinet and each file drawer image 450–500 are metaphors which provide an easy and intuitive way for users to manipulate documents in the computer system. In the preferred embodiment of the present invention, up to 1000 file drawer images are provided for, however a larger number of file drawer images is well within the scope of the present invention.

Figure 5:
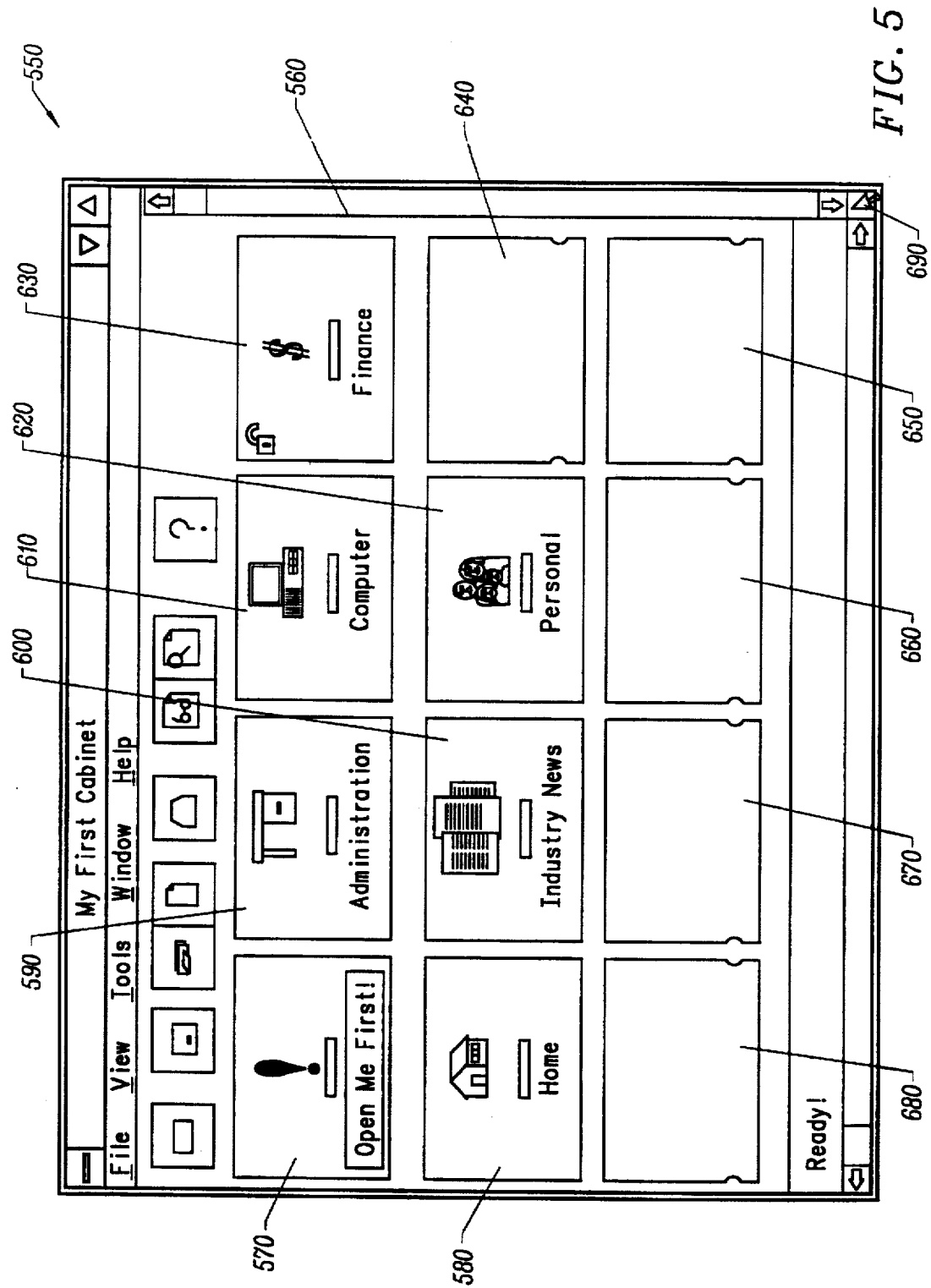
FIG. 5 illustrates another screen display of the file cabinet in FIG. 4.

FIG. 5 illustrates another screen display 550 of the file cabinet in FIG. 4. Screen display 550 includes a visible portion 560 of the file cabinet, file drawer images 570–630, and a plurality of empty spots or drawer opening images 640–680.

A cursor 690 increases the visible portion of the file cabinet area from visible portion 400 in FIG. 4, to visible portion 560 by increasing the size of the screen display 550 using well known techniques. As illustrated, file drawer image 630 as well as the plurality of drawer opening images 640–680 that were obscured in FIG. 4 are now visible to the user. The plurality of drawer opening images 640–680 are metaphors which represent locations in visible portion 560 where file drawer images 570–630 may be moved to.

As is illustrated in FIGS. 4 and 5 and in many of the subsequent figures, the preferred embodiment of the present invention displays the file drawer images 570–630 and the plurality of drawer opening images 640–680 in a grid-type arrangement on the display. This grid-type arrangement provides the users with a familiar interface of a physical file cabinet. The placement of an icon on a drawer as illustrated further aids the user in quickly identifying the drawer. Many other shapes for file drawer images and arrangements for file drawer images and drawer opening images are of course foreseeable for users more familiar with computer interfaces.

Figure 6:
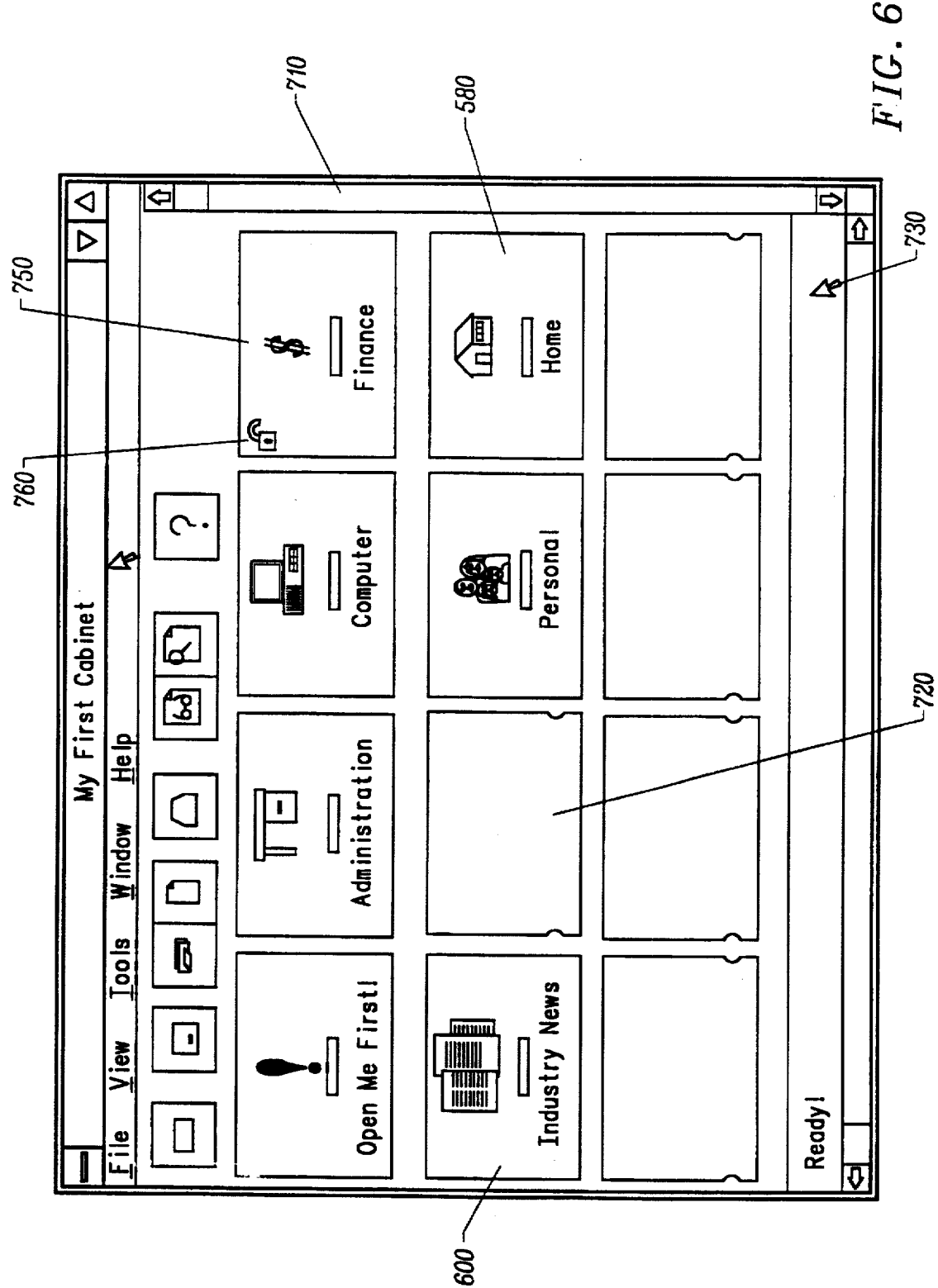
FIG. 6 illustrates a screen display of the file cabinet in FIG. 5 with file drawer images re-arranged.

FIG. 6 illustrates a screen display 710 of the file cabinet in FIG. 5 with file drawer images re-arranged. FIG. 6 includes file drawer images 580 and 600 and drawer opening image 720.

Using cursor 730 and conventional drag and drop methods, file drawer image 580 is first moved to a position on screen display 710 where drawer opening image 540 was formerly located (FIG. 4). Next, again using conventional drag and drop methods, file drawer image 600 is moved to a position on screen display 710 where file drawer image 580 was formerly located (FIG. 5). Because the location on the screen display 710 where file drawer image 600 was located in FIG. 5 does not have a file drawer image, a drawer opening image 730 is drawn in that location. The position of the drawers within the filing cabinet provides a degree of organization and ready identification of drawers.

Figure 7A:
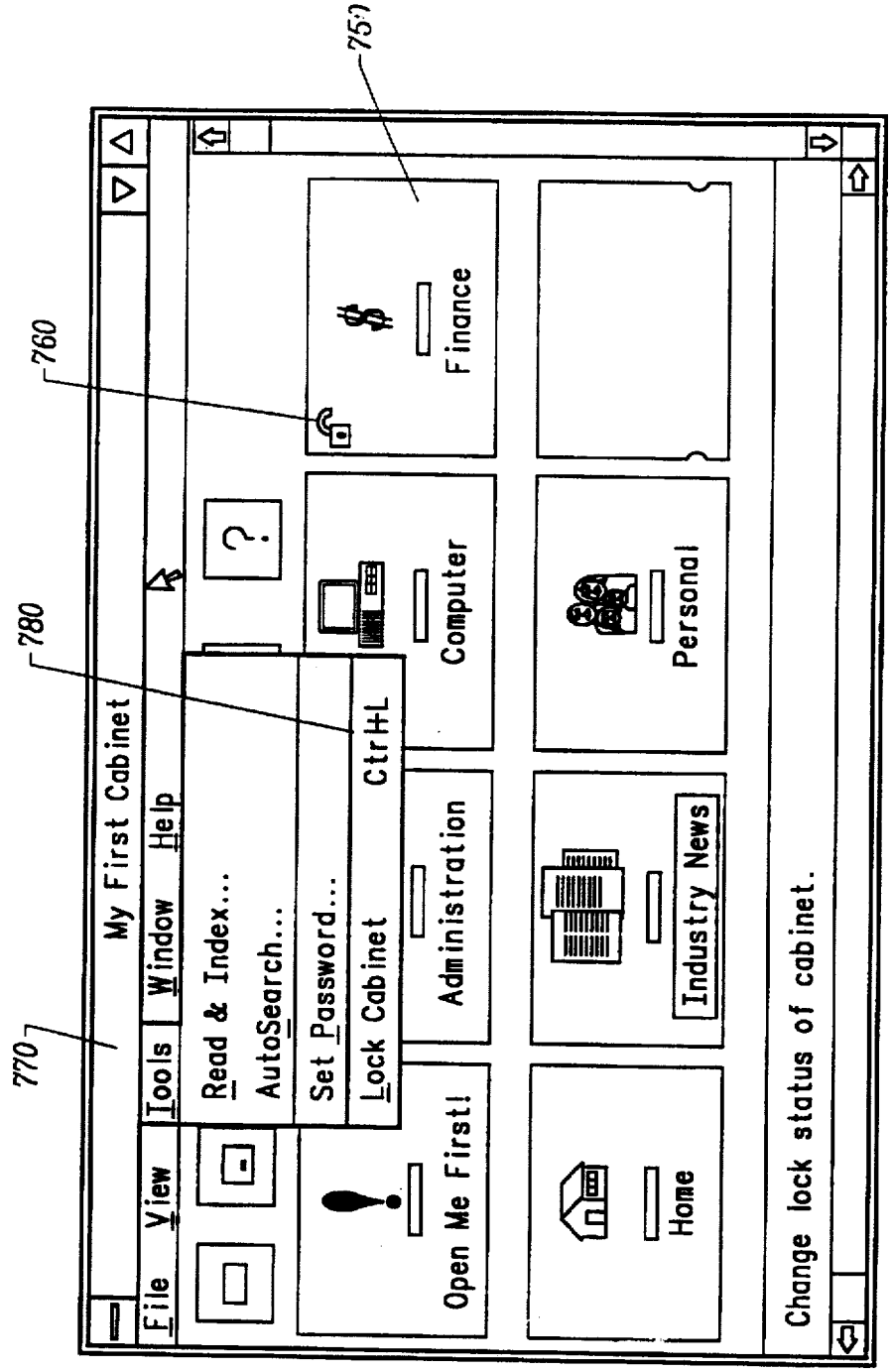
FIGS. 7A and 7B illustrate the process of locking a file drawer.
Figure 7B:
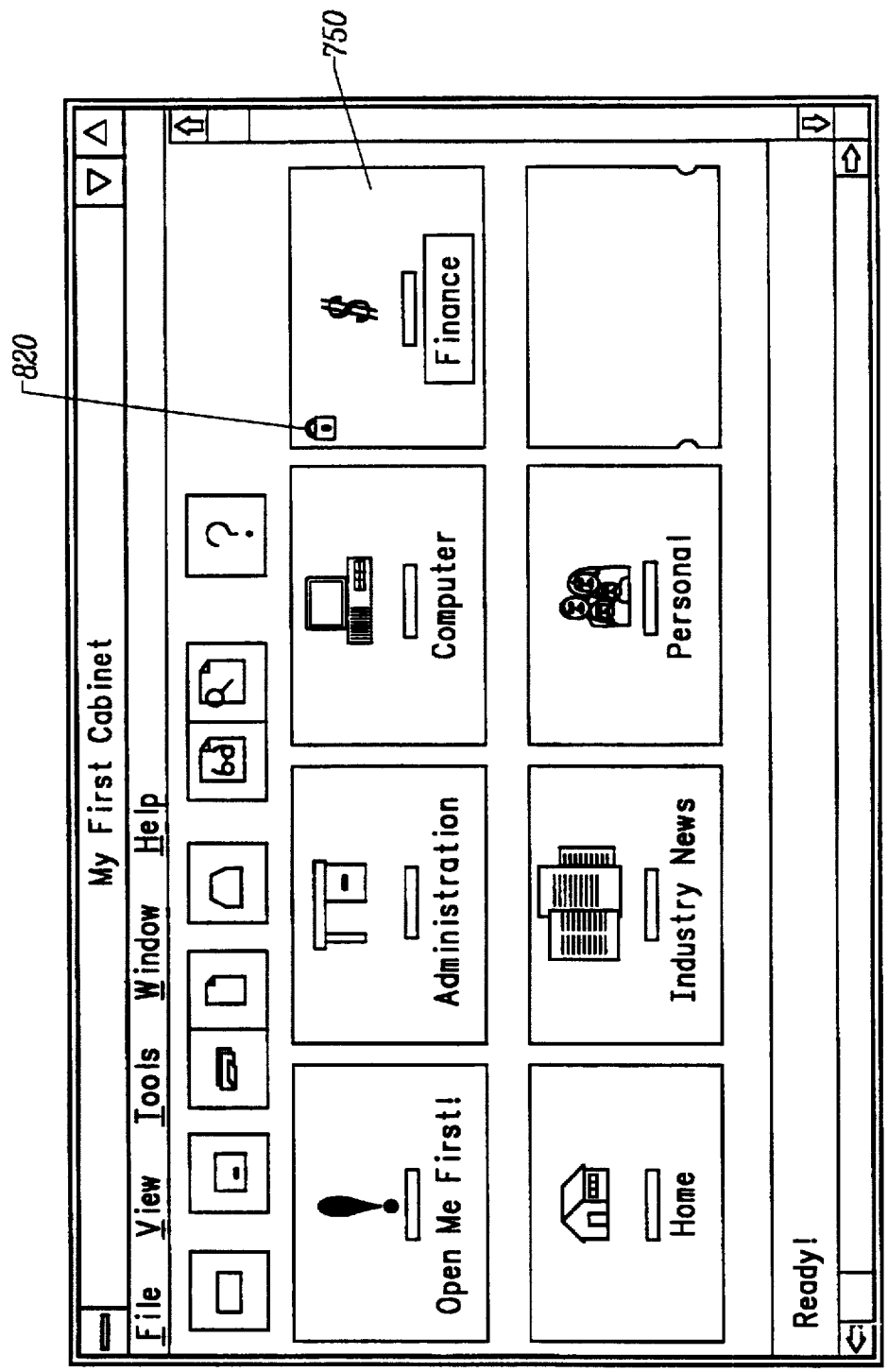

The capability to move file drawer images within a file cabinet by using drag and drop methods extends across file cabinets. In one embodiment of the present invention where multiple file cabinets can be displayed to the user at one time, as will be illustrated later, the user simply selects and drags a file drawer image from one file cabinet to another file cabinet. An exemplary use for such capability is if the user has a portable computer and an base computer, each computer with file cabinets. Such capability allows a user to easily configure the portable computer to contain only those file drawers needed away from the base computer, by simply dragging a file drawer image from the base station to the portable computer FIGS. 7A and 7B illustrate the process of locking a file drawer. FIG. 7A includes file drawer image 750 including an opened lock icon 760 and a pull down "Tools" menu 770 including a "Lock Cabinet" command 780. FIG. 7B includes file drawer image 750 including closed lock icon 820.

Contents of a file drawer associated with file drawer image 750 is restricted when the user invokes a "Lock Cabinet" command 780. In the default mode, the contents of a file drawer associated with a file drawer image are accessible if there is either an opened lock icon 760 on the file drawer image or if there is no lock icon at all. When the file drawer image includes an opened lock icon, such as 760, the user selects the "Lock Cabinet" command 780 to prevent the contents of the file drawer to be accessed, searched, viewed, etc. Preferably once the user enters a password authorizing the locking of file drawers, all file drawers having file drawer images with opened lock icon 760 are locked, and then the file drawer images are displayed with a closed lock icon 820, as in FIG. 7B. To open locked file drawers, the user clicks upon a file drawer image such as 750, then is prompted for the correct password.

In alternative embodiments of the present invention, file drawers may be individually locked and unlocked using individual, unique passwords. In the present, an entire file cabinet may be locked and unlocked with a single password.

Figure 8A:
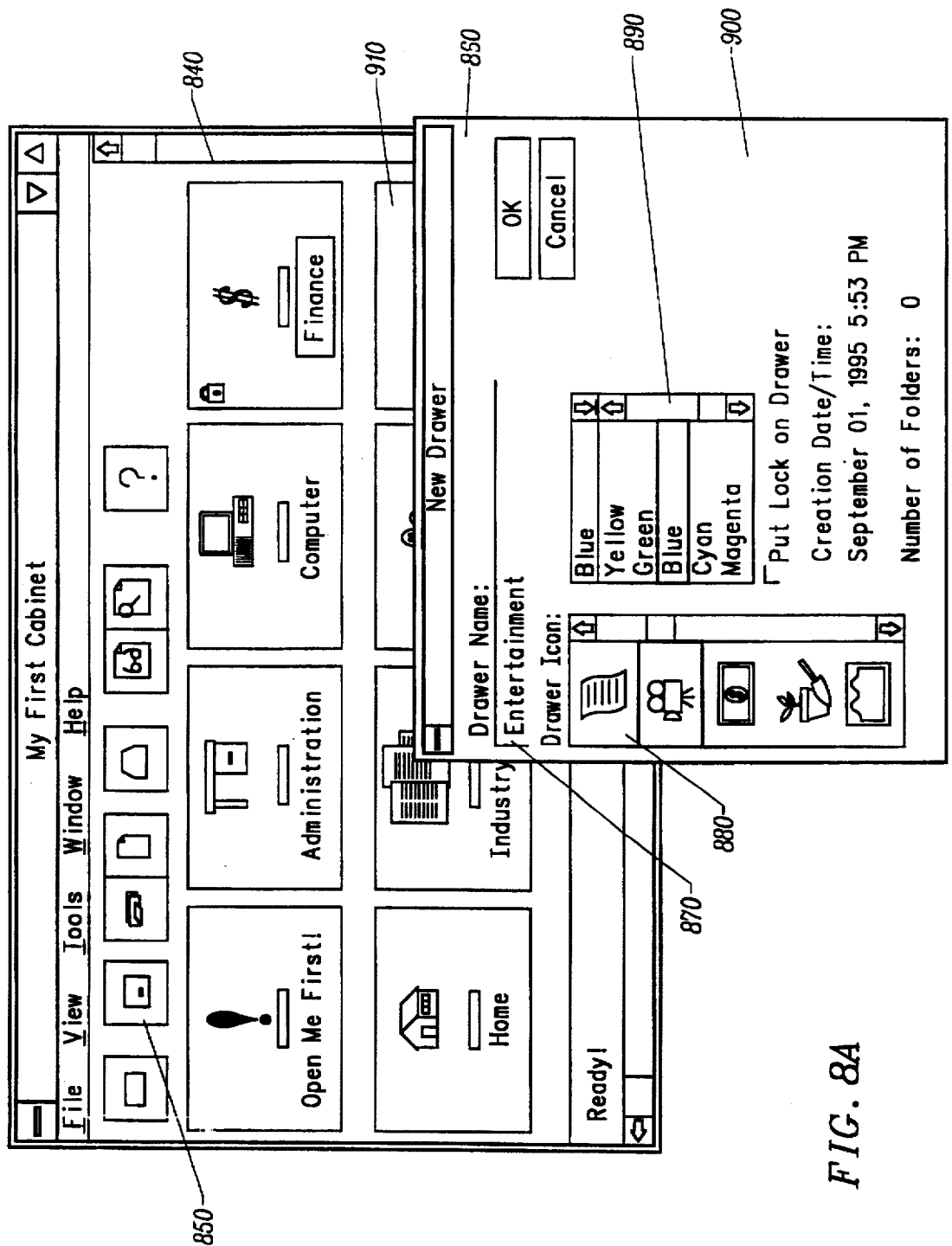
FIG. 8A illustrates the user interface providing the user with the ability to create new file drawers and associated file drawer images for the file cabinet.

FIG. 8A illustrates the user interface providing the user with the ability to create new file drawers and associated file drawer images for the file cabinet. FIG. 8A includes a visible portion 840, function button 850, and window 860. Window 860 includes a drawer name dialog control box 870, drawer icon dialog control box 880, text color dialog control box 890, and lock dialog control box 900.

When the user selects function button 850, in response, window 860 is displayed to the user. Using conventional input by keyboard, mouse, etc. the user may enter or select a name for identifying the file drawer, through use of dialog control box 870. This name is preferably displayed on the drawer. The color of the text can also be selected using conventional methods, in dialog control box 890. Color coding of the text is provided to allow the user to visually organize the file cabinet images by text color if desired.

An icon is preferably selected for display on the drawer through dialog area 880. Selection of the icon can be made using conventional input devices such as the mouse or keyboard. Icons serve as a visual reminder regarding the contents of the file drawer, however an icon need not be selected if desired.

In lock dialog control box 900, the user can select whether to allow the file drawer to be locked, as described in conjunction with FIGS. 7A and 7B.

Figure 8B:
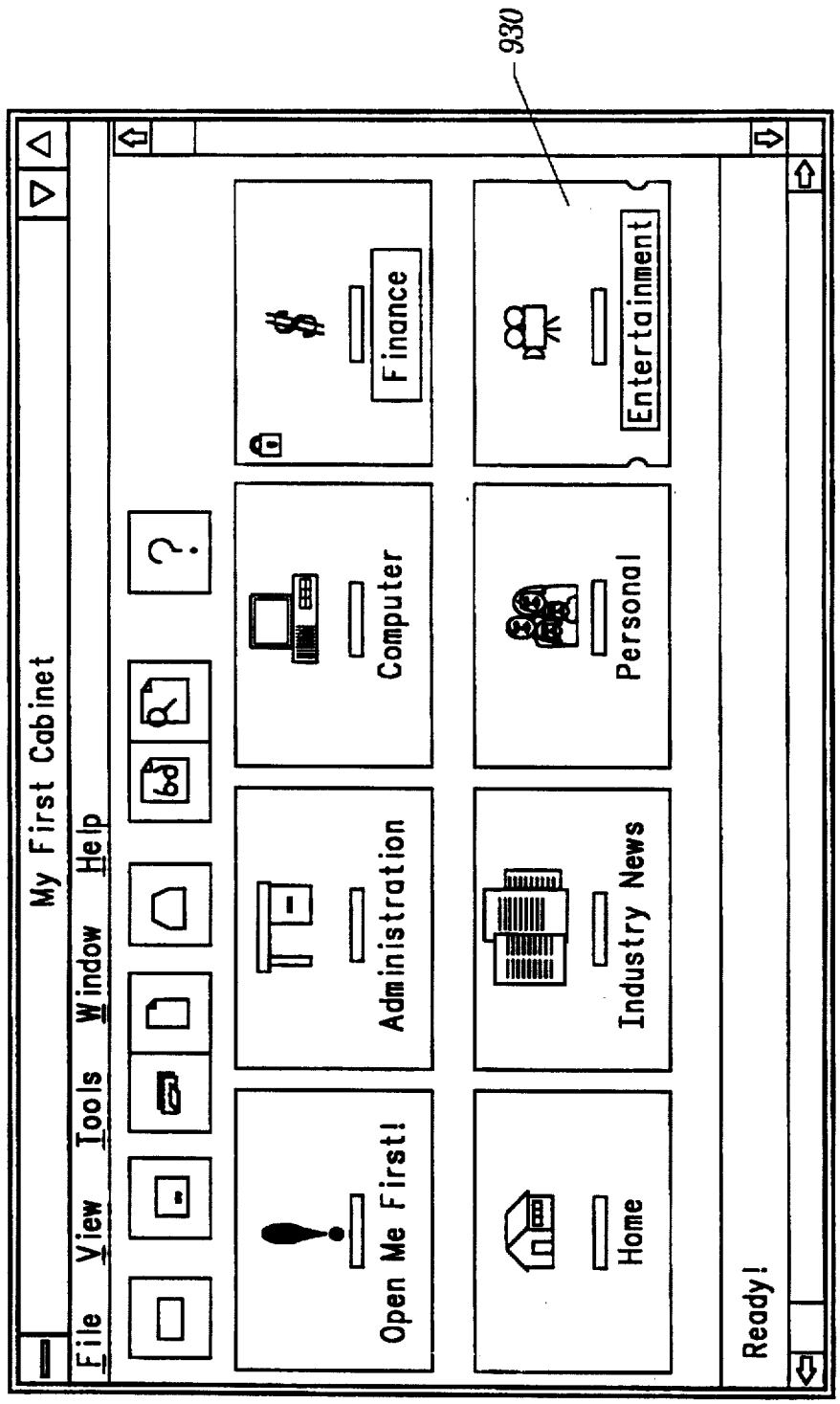
FIG. 8B illustrates the results of adding a new file drawer image for the file cabinet in FIG. 8A.

FIG. 8B illustrates the results of adding a new file drawer image for the file cabinet in FIG. 8A. In FIG. 8B, file drawer image 930 is displayed in a location in the file cabinet where drawer opening image 910, in FIG. 8A, was previously located.

In the preferred embodiment of the present invention, new file drawer images are initially placed in a file cabinet in a top to bottom, left to right ordering scheme. Once file drawer images are placed within the file cabinet, the file drawer images can be moved to locations on the display where there are file drawer opening images as was described in conjunction with FIG. 6.

Existing file drawers properties are modified also using the commands in window 860. To display the properties of an existing file drawer, the user selects a file drawer image and then invokes a Drawer Properties command in the File menu (see FIG. 9A) to display the present properties of the file drawer and file drawer image. The user can then change the properties in the same manner as when creating a new file drawer and new file drawer image, described above. Other commands applicable for file drawers are apparent from the File pull-down menu which appears in FIG. 9A including opening, closing and deleting file drawers and associated file drawer images.

Figure 9A:
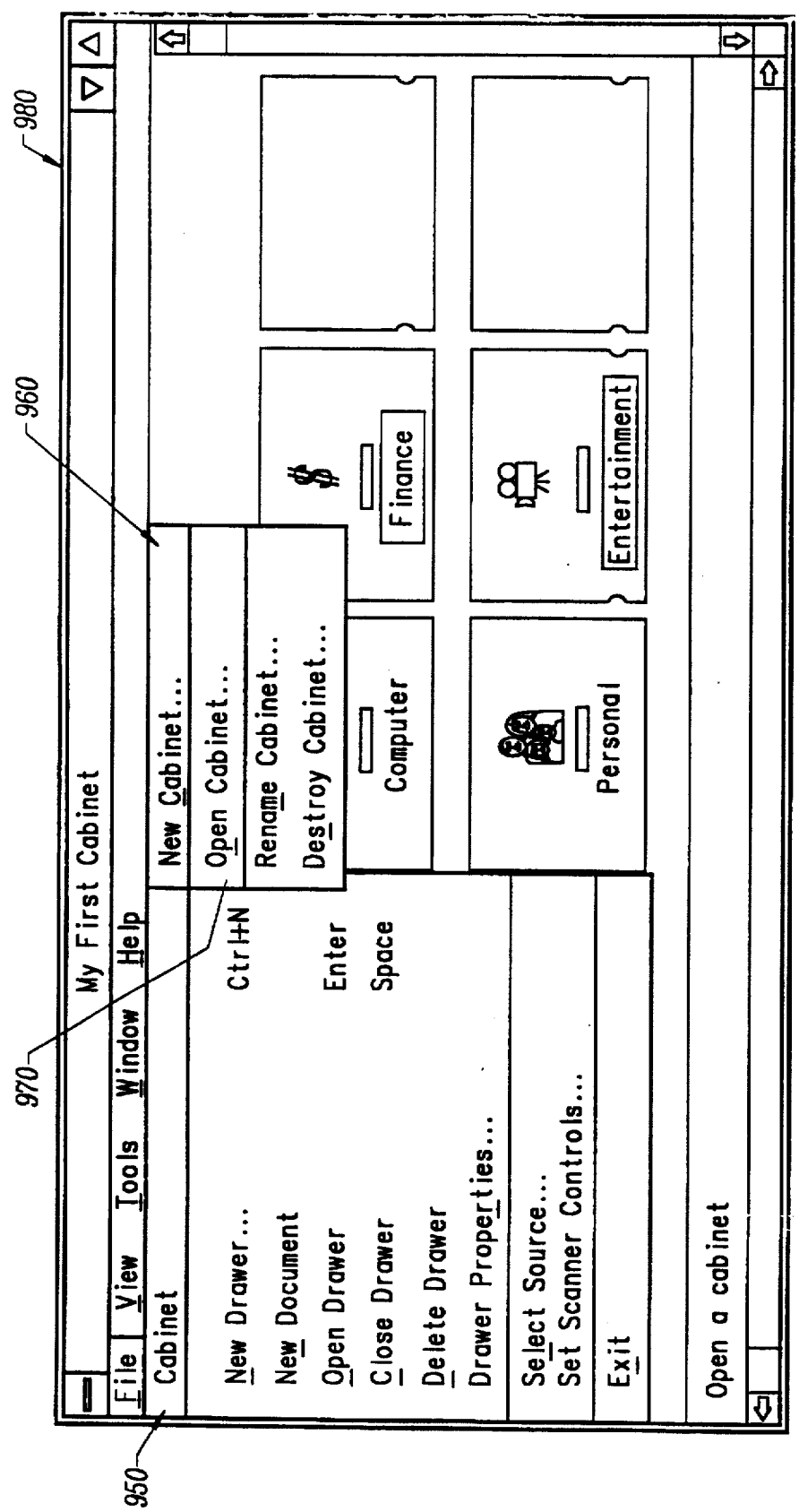
FIGS. 9A–9C illustrate the process of opening multiple file cabinets.
Figure 9B:
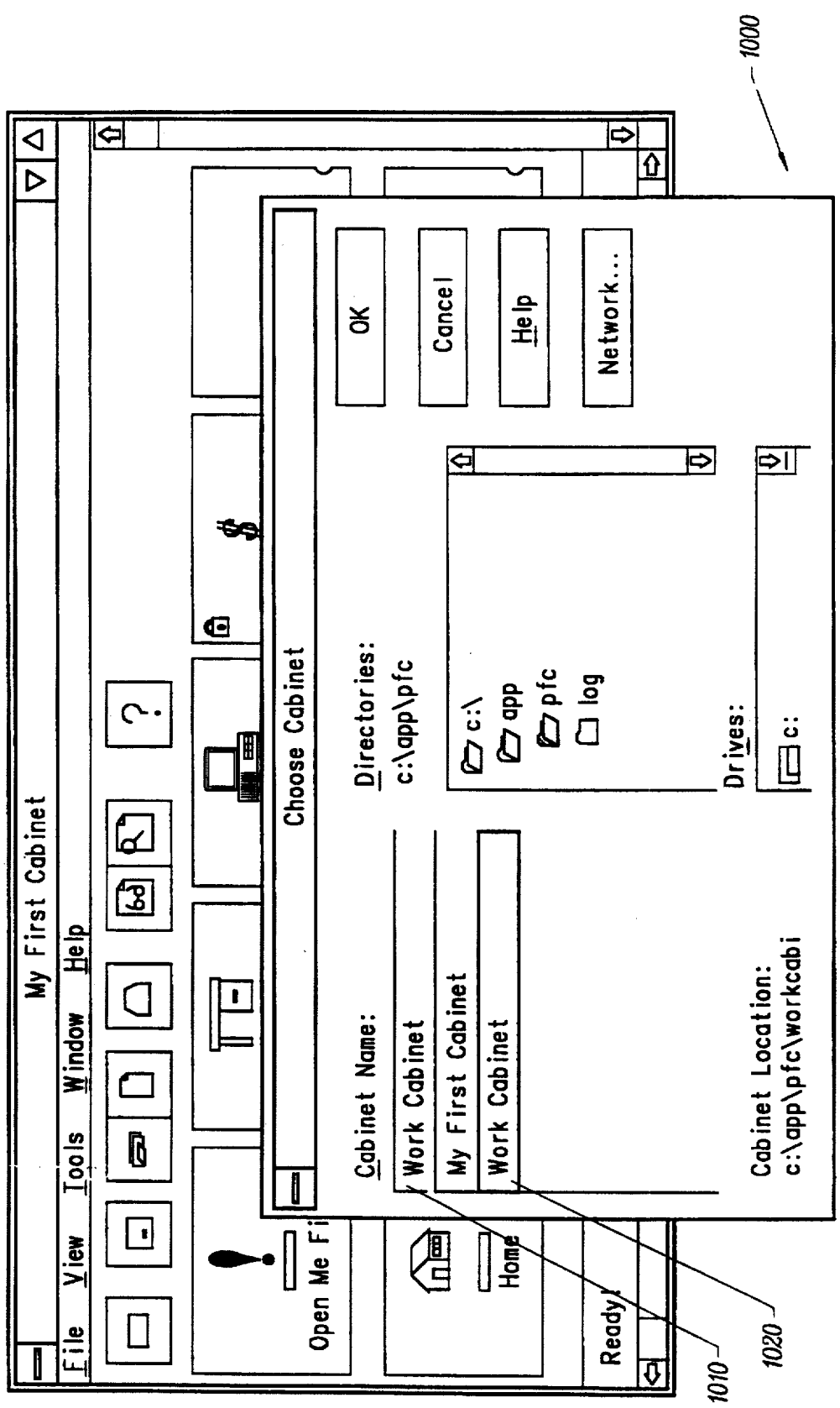
Figure 9C:
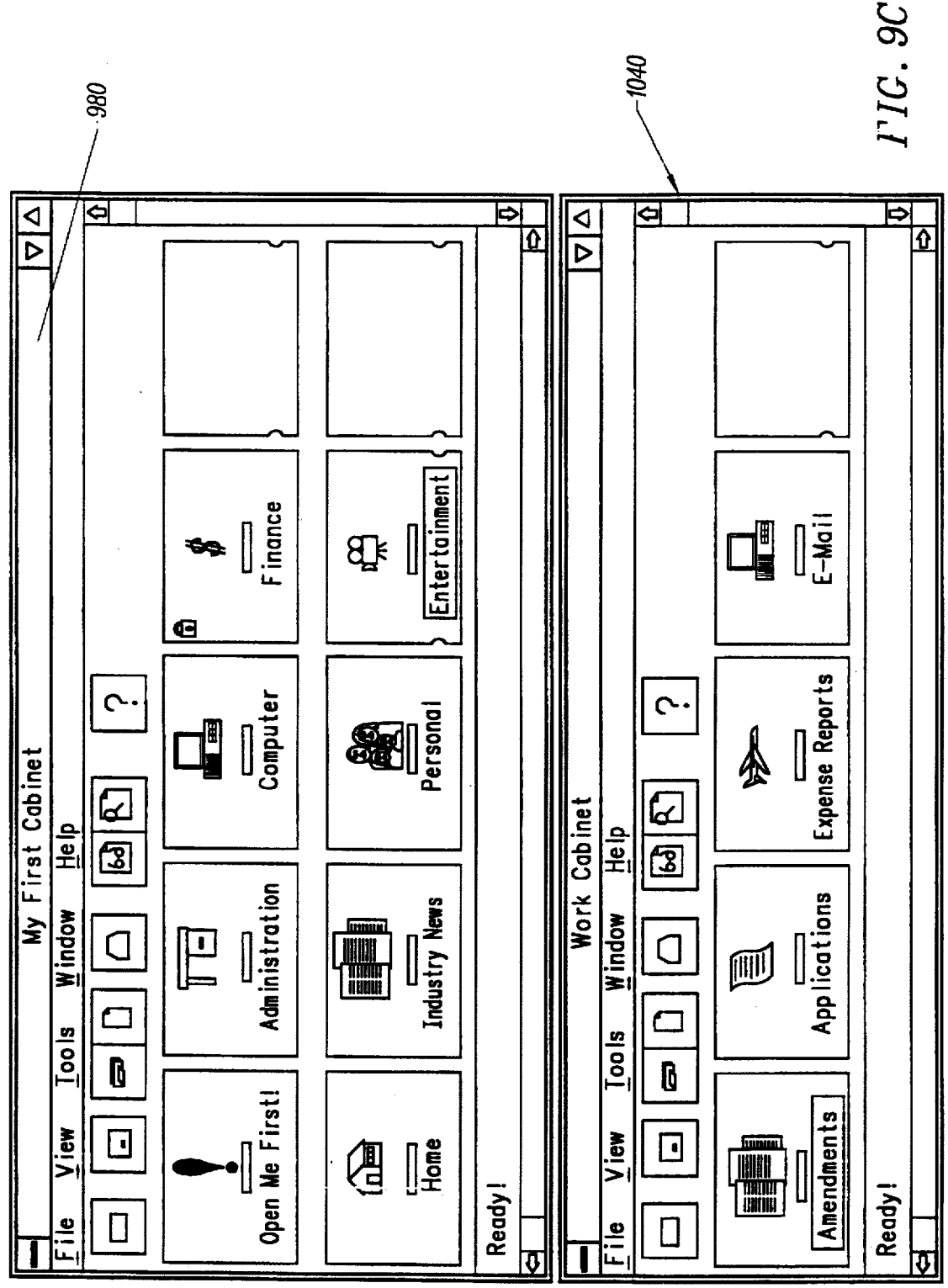

FIGS. 9A–9C illustrate the process of opening multiple file cabinets. FIG. 9A includes a File pull down menu 950 having a Cabinet pull down menu 960. The Cabinet pull down menu 960 includes commands such as Open Cabinet command 970. Window 980 represents the file cabinet named "My First Cabinet." FIG. 9B includes a window 1000 including a dialog control box 1010. FIG. 9C includes window 980 from FIG. 9a, as well as window 1040. Window 1040 represents the file cabinet named "Work Cabinet."

Using conventional user input devices, the user opens existing file cabinets through the Open Cabinet command 970 in the File pull down menu 950 and Cabinet pull down menu 960. In response to the Open Cabinet command 970, window 1000, in FIG. 9B appears as illustrated. Within window 1000 the user enters the name of an existing file cabinet through dialog control box 1010. Alternatively, the user selects a file cabinet from a list of file cabinets appearing under dialog control box 1010. In FIG. 9B the user has selected Work Cabinet 1020. In response to the selection, window 1040, in FIG. 9C appears on the display. As illustrated, the window 1040 includes the Work Cabinet file cabinet including a plurality of file drawers.

Multiple file cabinets allow the user to organize materials by separate file cabinets. As shown in Cabinet pull down menu 960, the user may create new file cabinets, rename existing file cabinets and destroy existing file cabinets.

Figure 10:
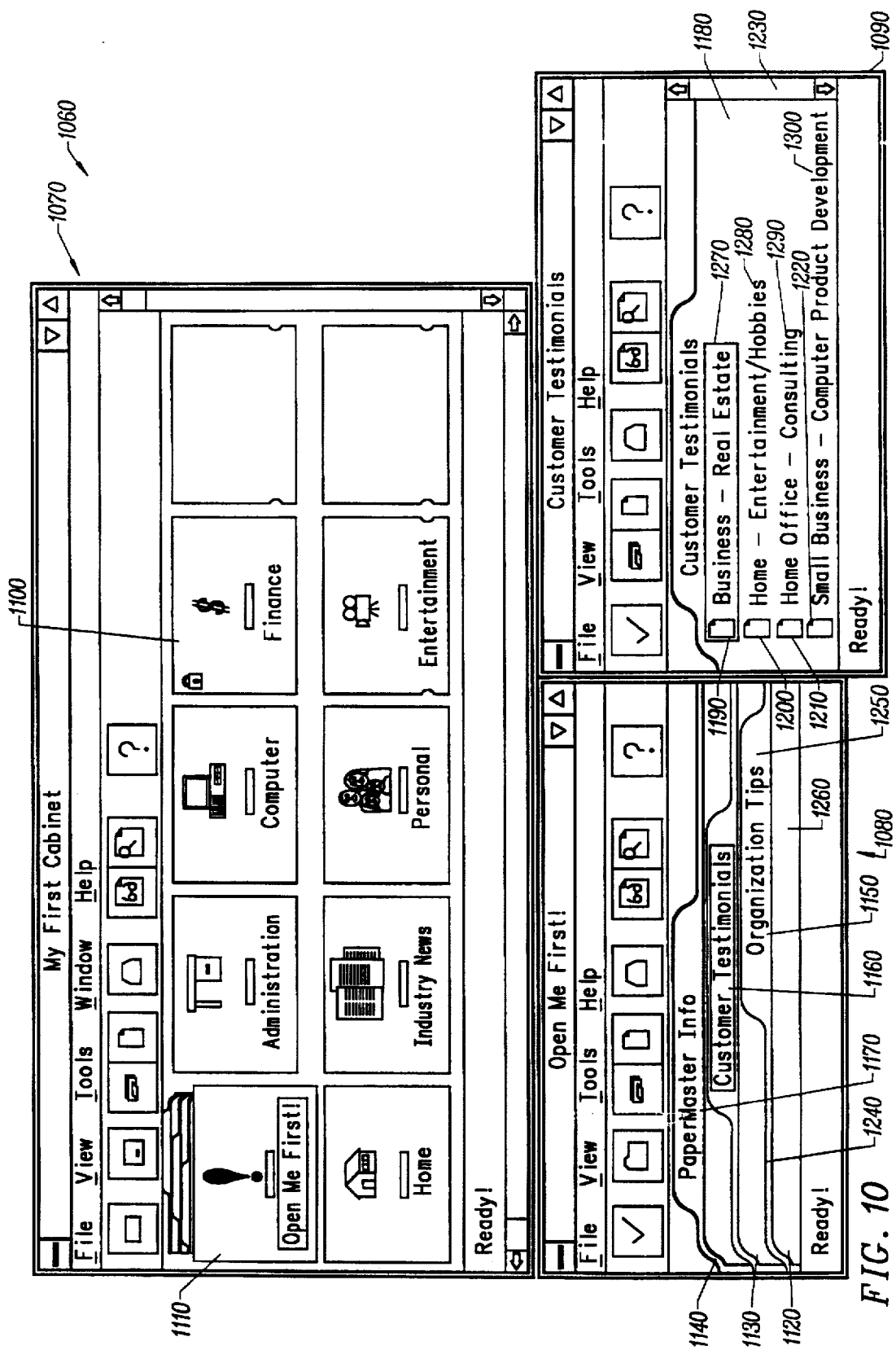
FIG. 10 illustrates a screen display according to a preferred embodiment of the present invention.

FIG. 10 illustrates a screen display 1060 according to a preferred embodiment of the present invention. Screen display includes windows 1070, 1080, and 1090. Window 1070 includes a visible region of the file cabinet including file drawer images 1100 and an open file drawer image 1110. Window 1080 includes file folder images 1120–1140, each having a respective file folder name 1150–1170. Window 1090 includes an open file folder image 1180 including document icons 1190–1220, vertical scroll bars 1230, and document names 1270–1300.

Using the user input device, the user opens a file drawer by clicking on the associated file drawer image, such as file drawer image 1000. In response to the selection of a particular file drawer, an open file drawer image replaces the original file drawer image. In FIG. 10, open file drawer image 1110 illustrates that the file drawer image called Open Me First, has been selected.

As illustrated in FIG. 10, in response to the selection of the file drawer associated with open file drawer image 1110, a window 1080 is opened displaying the contents of the file drawer. Here, the file drawer includes three file folders: 1120–1140.

File folder images, such as 1120–1140, each resemble a physical file folder having a back cover, such as 1240, with a tabbed portion, such as 1250, and a front cover, such as 1260, folded over the back cover and partially obscuring the back cover. Each file folder image preferably includes a descriptive name for the contents of the file folder, as illustrated by file folder names 1150–1170.

To view the contents of a particular file folder, the user selects one of the file folder images such as file folder image 1160. As illustrated, in response to selecting file folder image 1160, a window 1090 is opened which displays the contents of the file folder associated with file folder image 1160. Documents stored in the file folder are displayed to the user as document icons 1190–1120 having associated document names 1270–1300. The document names 1270–1300 can be edited through conventional methods. On the display when a file folder is opened, the file folder image may indicate that the file folder is open.

Scroll bar 1230 is provided when the window 1090 does not display all of the documents located in the file folder. Using conventional methods, the user scrolls downwards or upwards using vertical scroll bars 1230 to view the entire list of documents in the file folder.

Scroll bars may be used also in conjunction with window 1080 if the window 1080 does not display all of the file folders located in the open file drawer. In another embodiment of the present invention, file folder images, such as 1120–1140 are automatically sized in relation to window 1080. Accordingly, the size of file folder images 1120–1140 are dependent upon the size of window 1080, when window 1080 is small, file folder images 1120–1140 are reduced in size and when window 1080 is large, file folder images 1120–1140 are increased in size. In one embodiment, document names 1270–1300 may maintain the same font size independent of the size of window 1080, however in another embodiment, document names 1270–1300 are also automatically resized dependent upon the size of window 1080. Accordingly, in the latter case, document names 1270–1300 are smaller and larger when window 1080 is smaller and larger, respectively.

Figure 11A:
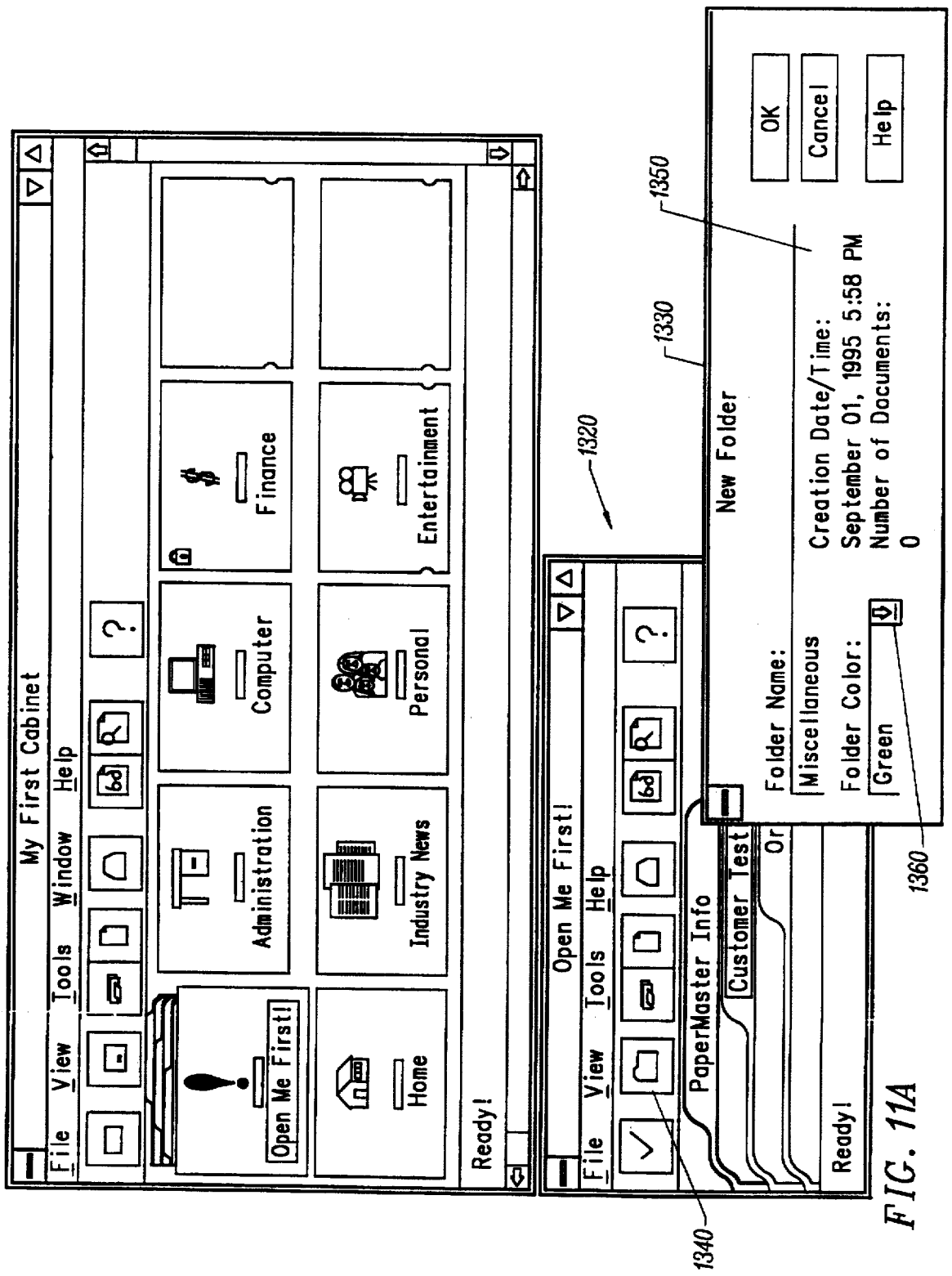
FIGS. 11A and 11B illustrate the process of adding a new folder to the open file drawer.
Figure 11B:
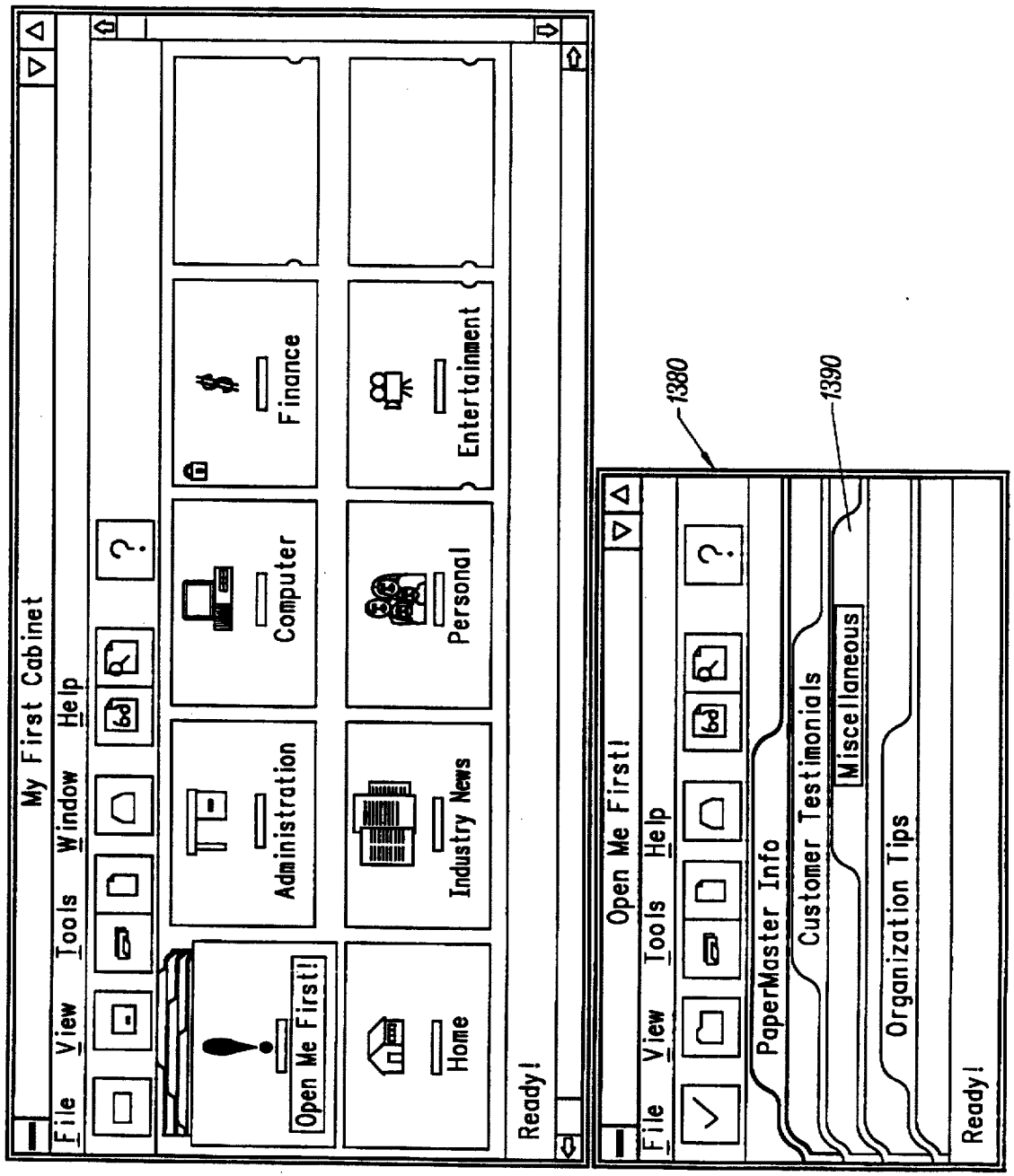

FIGS. 11A and 11B illustrate the process of adding a new folder to the open file drawer. FIG. 11 A includes a window 1320 including a function button 1340 and window 1330 including dialog control boxes 1350 and 1360. FIG. 11B includes a window 1380 including a new file folder 1390.

Figure 1A:
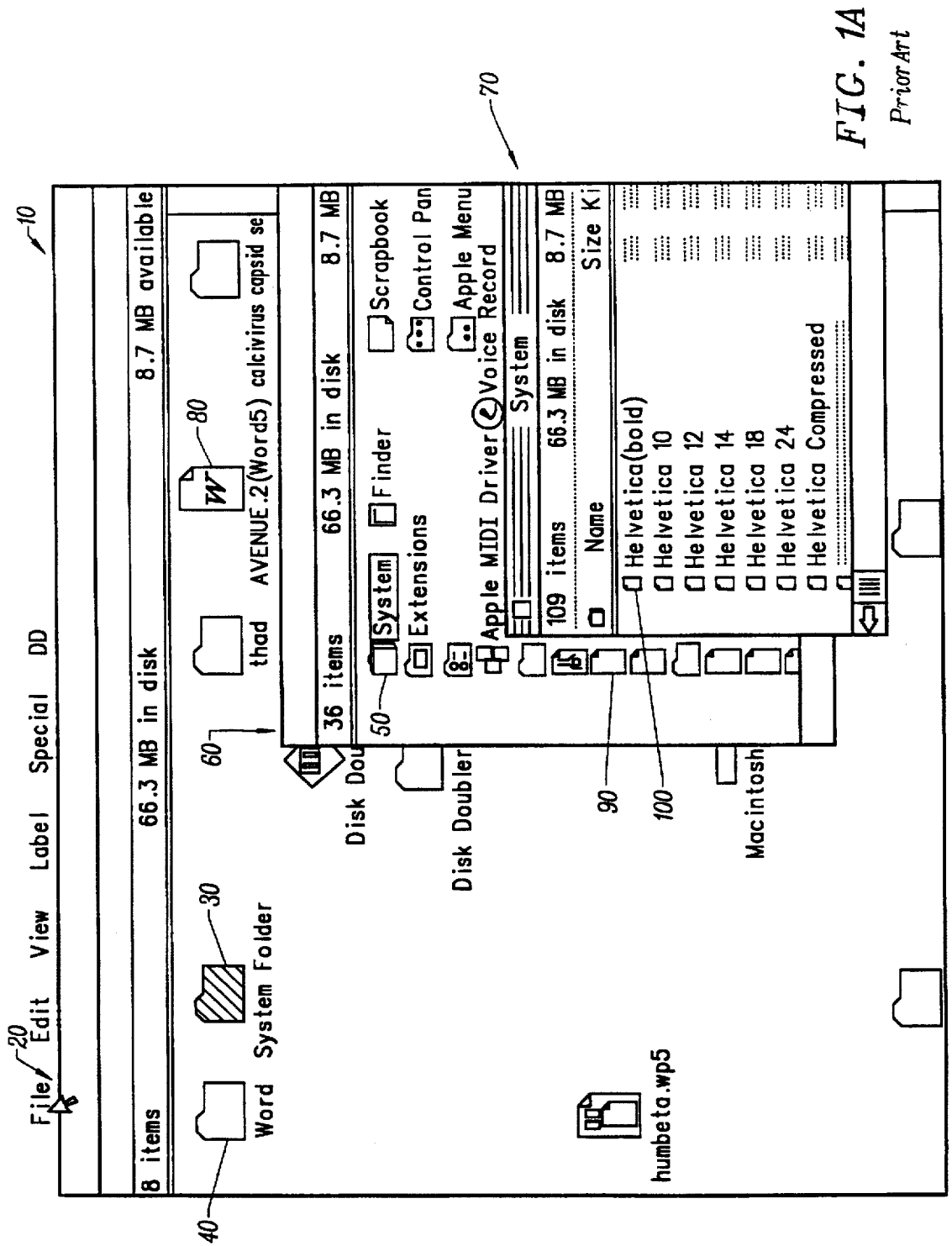
FIG. 1A illustrates a typical graphical user interface for manipulating documents.
Figure 1B:
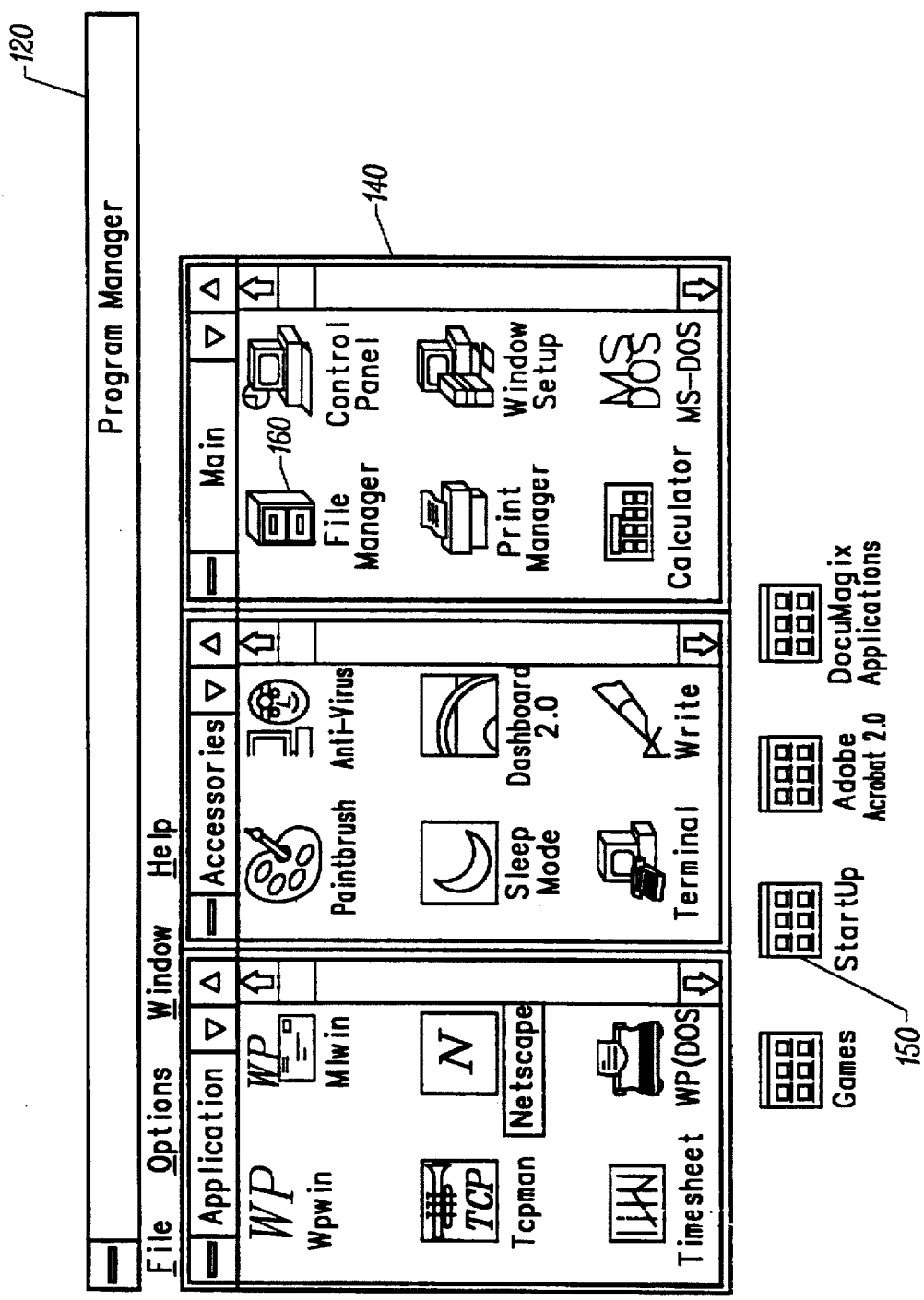
FIGS. 1B and 1C illustrates another typical graphical user interface for manipulating documents.
Figure 1C:
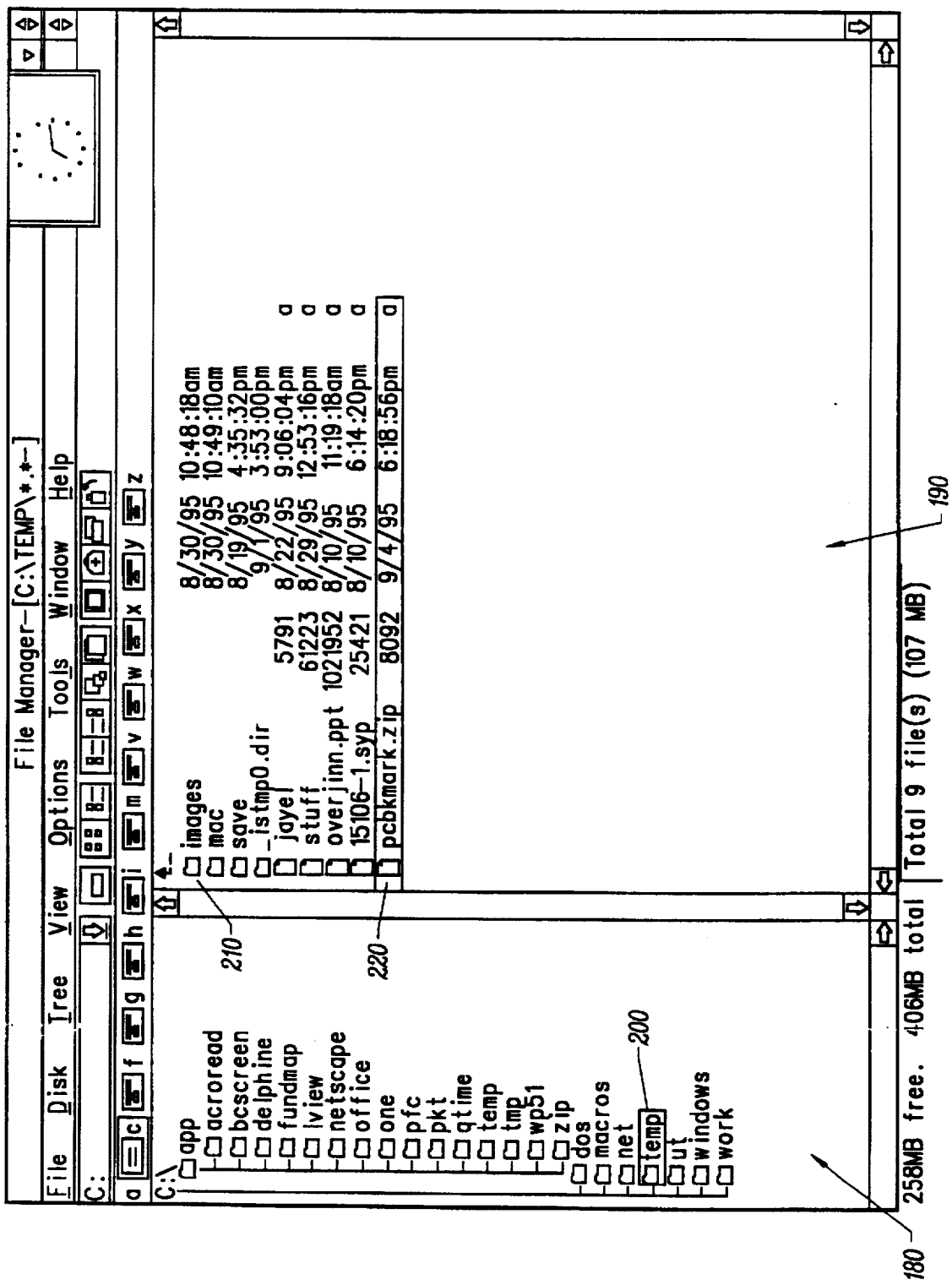

Within window 1320, when the user selects function button 1340 a new folder is created in the present file drawer and the characteristics of the file folder image are selected in window 1330. Window 1330 includes dialog control box 1350, enabling the user to define an optional name for the file folder, and includes dialog control box 1360, enabling the user to select a color for the new file folder. Coloring of a file folder other than a default color, is optional, although it allows the user to color-code folders based upon priority or subject matter. Icons could of course also be added to the file folders to enable quick identification of subject matter, etc. As illustrated in Fig. 1B, a file folder image defined in FIG. 11A appears as file folder image 1390 within window 1380.

Figure 12A:
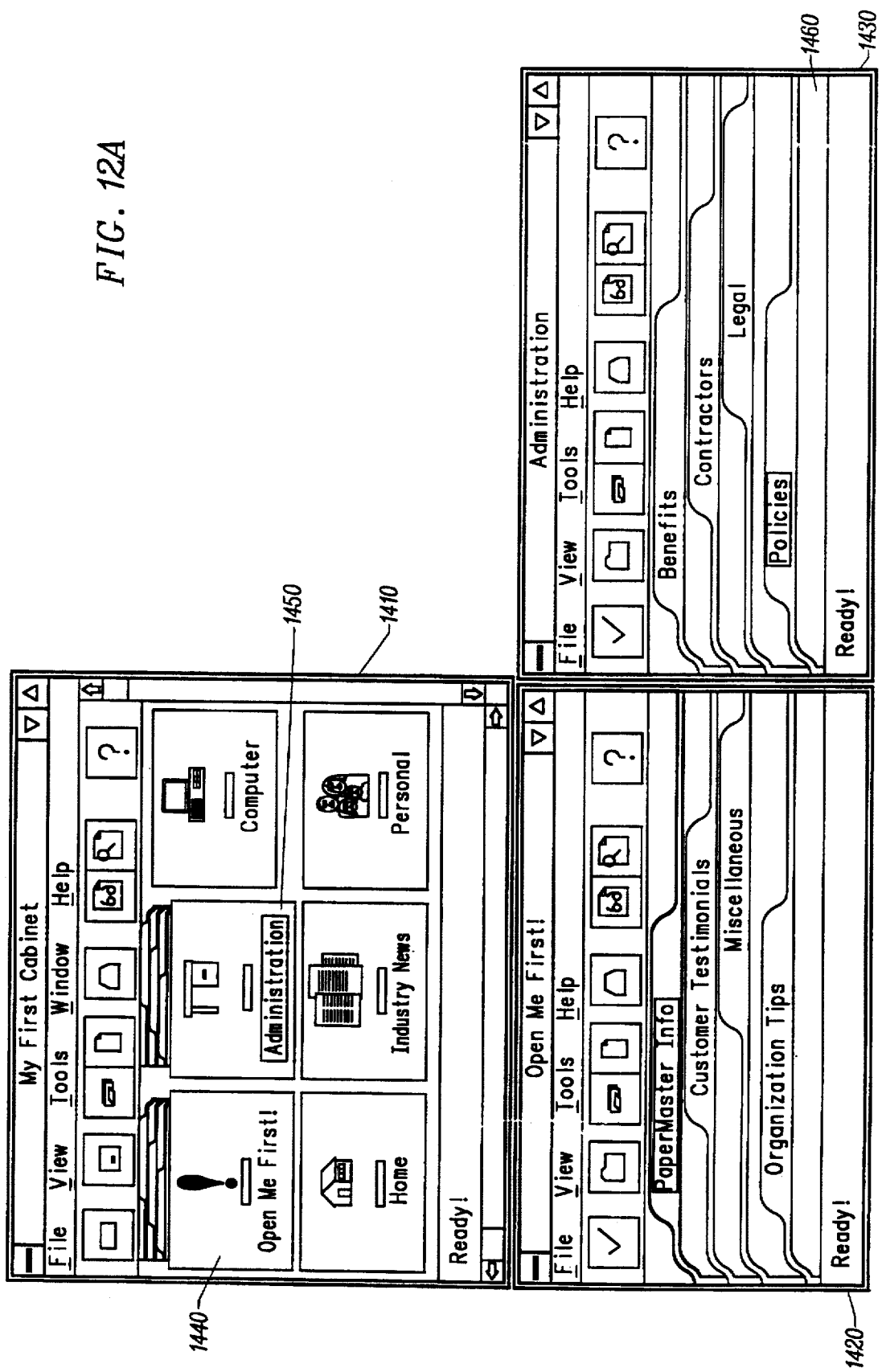
FIGS. 12A and 12B illustrate the process of moving a file folder from one file drawer to another file drawer.
Figure 12B:
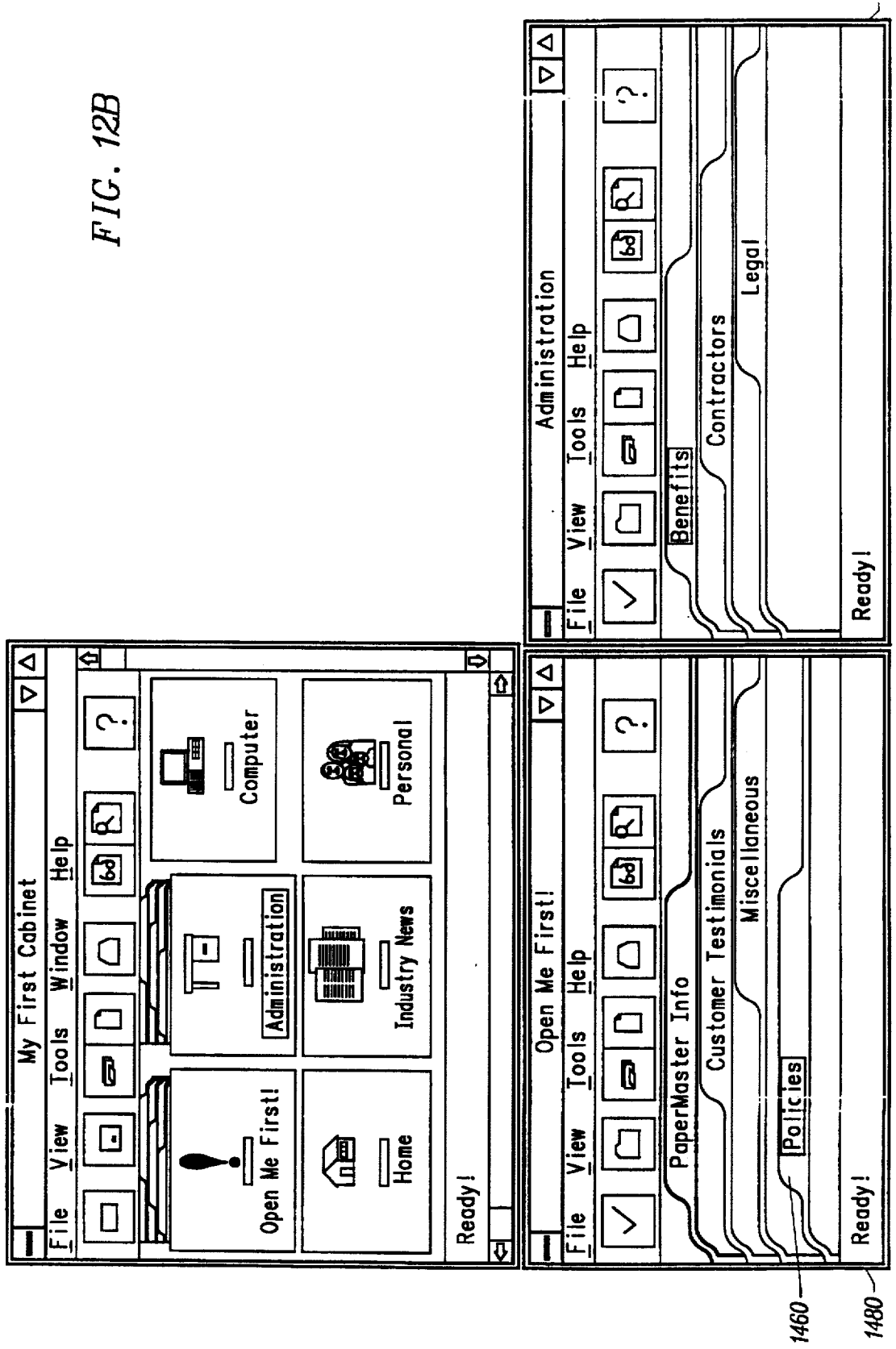

FIGS. 12A and 12B illustrate the process of moving a file folder from one file drawer to another file drawer. FIG. 12A includes windows 1410, 1420, and 1430. Window 1410 includes open file drawer images 1440 and 1450. The contents of the file drawer associated with open file drawer image 1140 are displayed in window 1420. The contents of the file drawer associated with open file drawer image 1450 are displayed in window 1430 and include a file folder having an associated file folder image 1460. FIG. 12B includes windows 1480 and 1490, window 1480 including file folder image 1460.

More than one file drawer may be open at the same time. For example, in FIG. 12A, file drawers associated with open file drawer image 1440 and open file drawer image 1450 are shown. In a preferred embodiment, the user moves a file folder from one file drawer to another file drawer, by using conventional drag and drop techniques. For example, the user selects file folder image 1460 in window 1430, moves file folder image 1460 into window 1420 and drops file folder image 1460 in window 1420. As seen in FIG. 12B, file folder image 1460 then appears in a window 1480 and disappears from window 1490. This operation is commonly called a "move" command. In the preferred embodiment, a drag and drop of a file folder from a first file cabinet to a second file cabinets simply duplicates the file folder but does not remove the original file from the first file cabinet. This operation is commonly called a "copy" command.

The user may distinguish between a copy and move command by selecting an appropriate command from the toolbar menu, or alternatively by using a mouse button to toggle between or select commands.

Figure 13A:
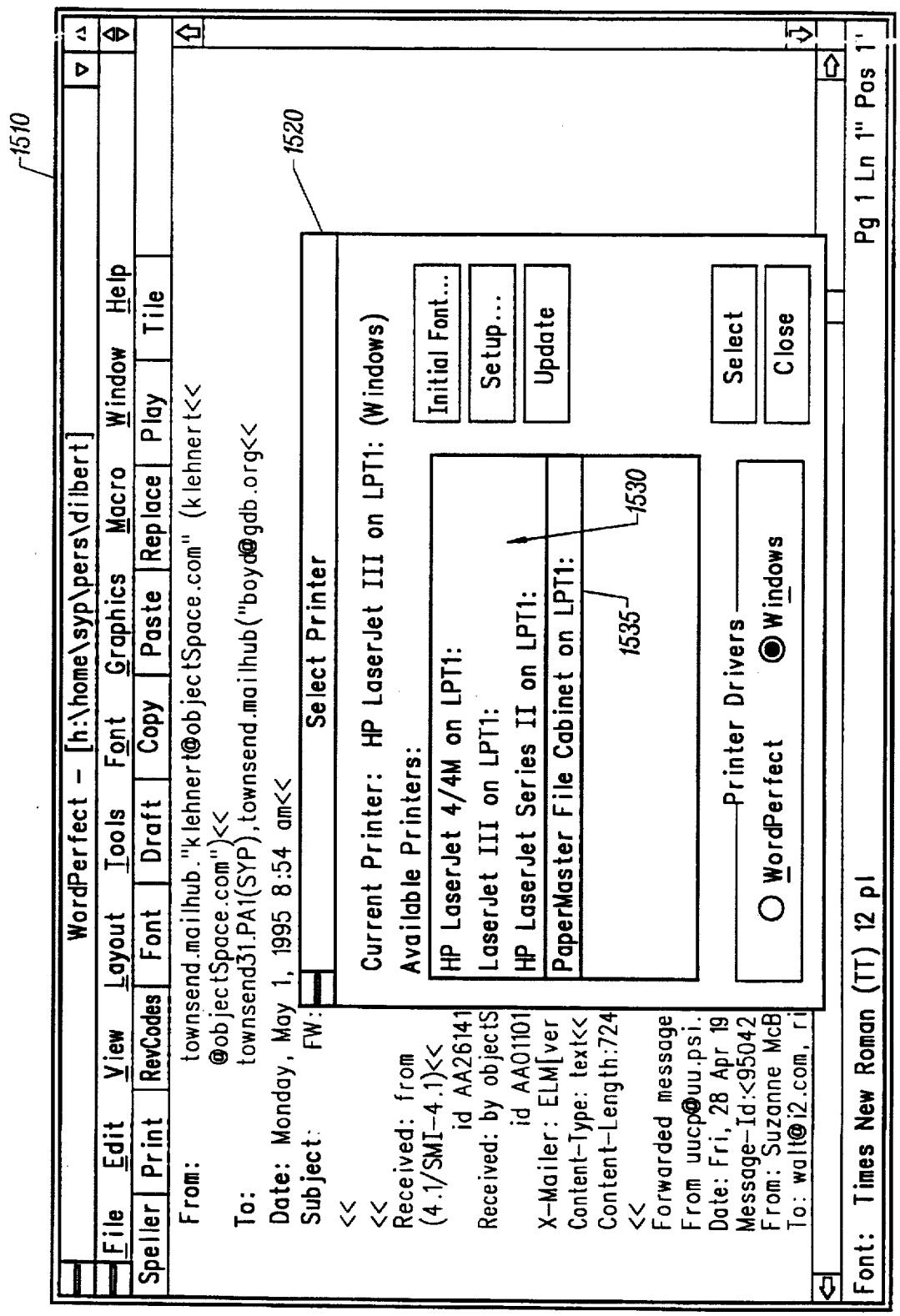
FIGS. 13A and 13B illustrate the process of storing documents from an application program.
Figure 13B:
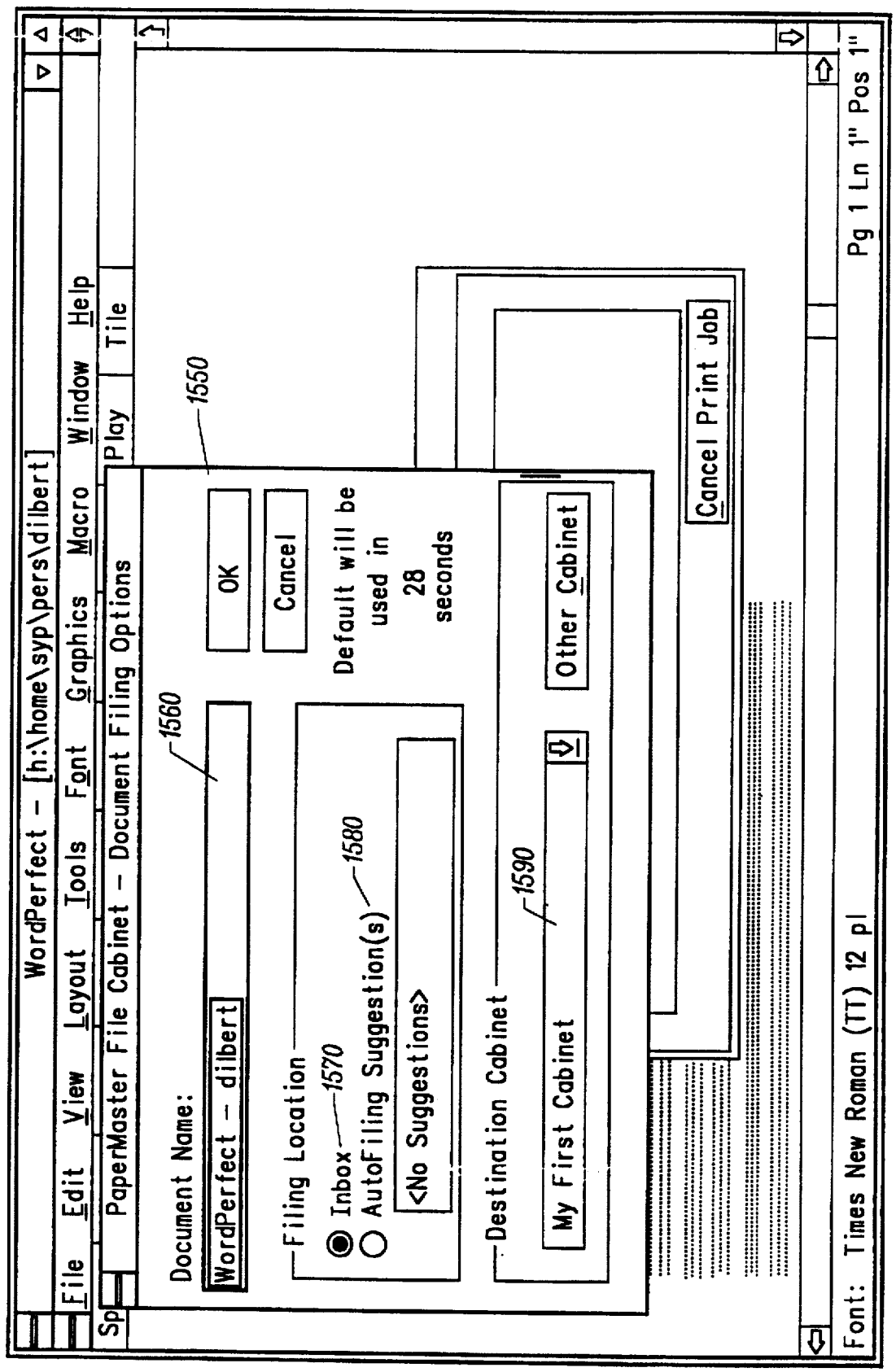

FIGS. 13A and 13B illustrate the process of storing documents from an application program. FIG. 13A includes a window 1510 from an application program and a window 1520. Window 1520 includes a list of printer drivers 1530 including driver 1535. FIG. 13B includes a window 1550. Window 1550 includes a document name dialog control box 1560, an inbox radio button 1570, a suggested filing radio button 1580, and a destination cabinet dialog control box 1570.

The user may distinguish between a copy and move command by selecting an appropriate command from the toolbar menu, or alternatively using a mouse button to toggle between commands.

To enter a document into a filing cabinet from within an application program, preferably a "print" command is invoked from within the application program. In order to select the filing cabinet as the destination for the printed document, the user typically selects a "printer setup" command found within a menu of the application window 1510. In response to the setup command, a window such as window 1520 is typically displayed to the user. The user then selects, from the list of available printers 1530, the driver 1535. Changing the printer driver typically does not need to be performed for subsequent printing to the file cabinet, however must be performed if the user wishes to print to printer. The user then outputs the document to the system of the present invention by selecting a "print" command found within the menu of the application window 1510.

After the document has been output to the system, a window such as window 1550 appears. Window 1550 allows the user to determine the destination of the output within the file cabinet. As illustrated, using dialog control box 1560 the user can change the name of the output document. Further, using dialog control box 1590 the user can determine which file cabinet from existing file cabinets is the destination for the output document.

Figure 15A:
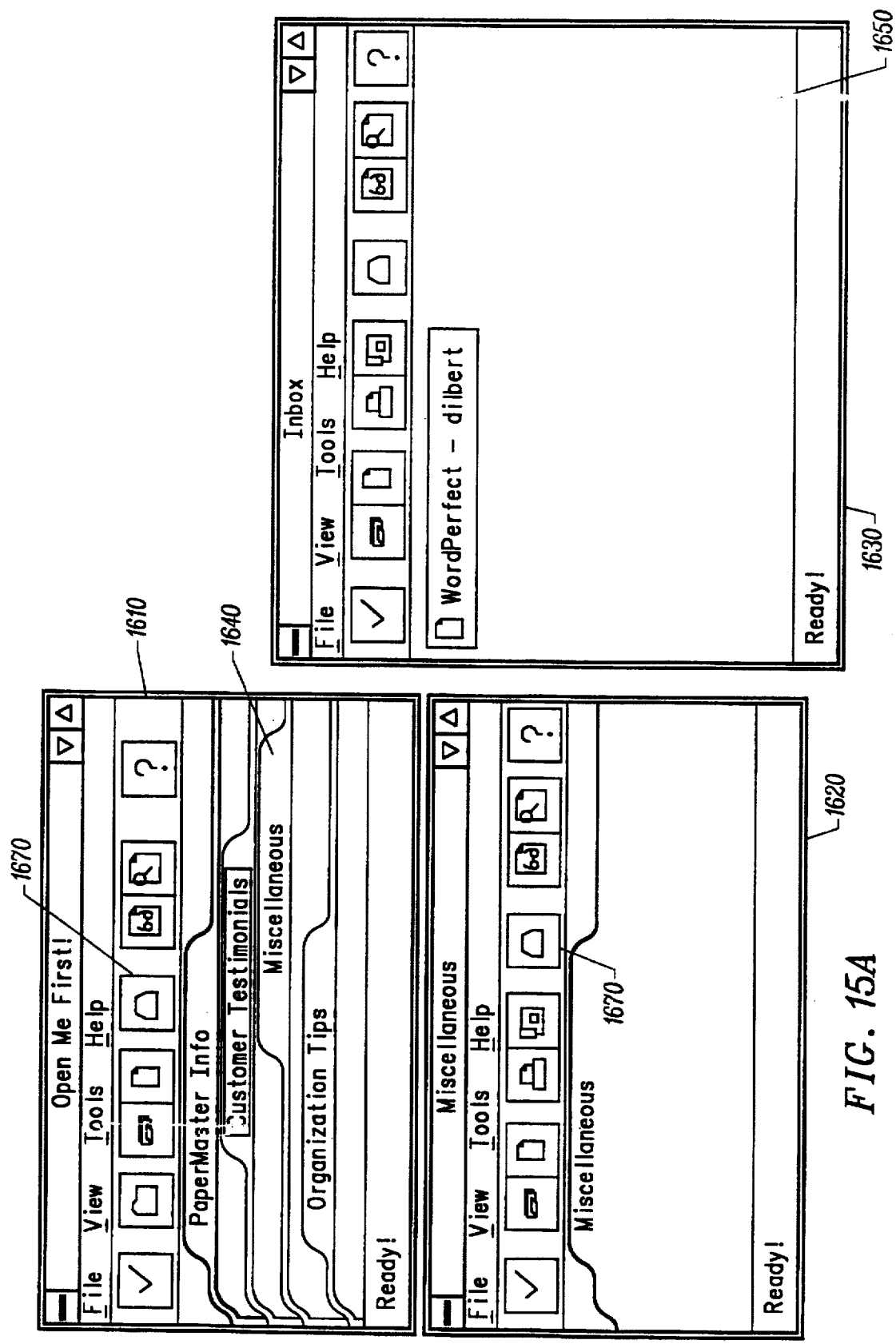
FIGS. 15A and 15B illustrate the process of moving a document from a source location to a destination location in a file cabinet.

There are two options for the destination file folder as indicated by inbox radio button 1570 and autofiling radio button 1580. When the user selects inbox radio button 1570, the output document is placed into an "inbox" of the file cabinet, as illustrated in FIG. 15A by window 1650. There is only one "inbox" in each file cabinet, and when the inbox radio button 1570 is selected, the later user typically manually selects the destination file folder for the output document from the inbox. When the user selects autofiling radio button 1580, a list of suggested destination file folders within the selected file cabinet are returned to the user. Methods of returning a list of destination file folders based upon characteristics of the output document, etc. are disclosed in Co-pending application Ser. No. 08/337,643, commonly assigned and herein incorporated by reference.

Figure 14:
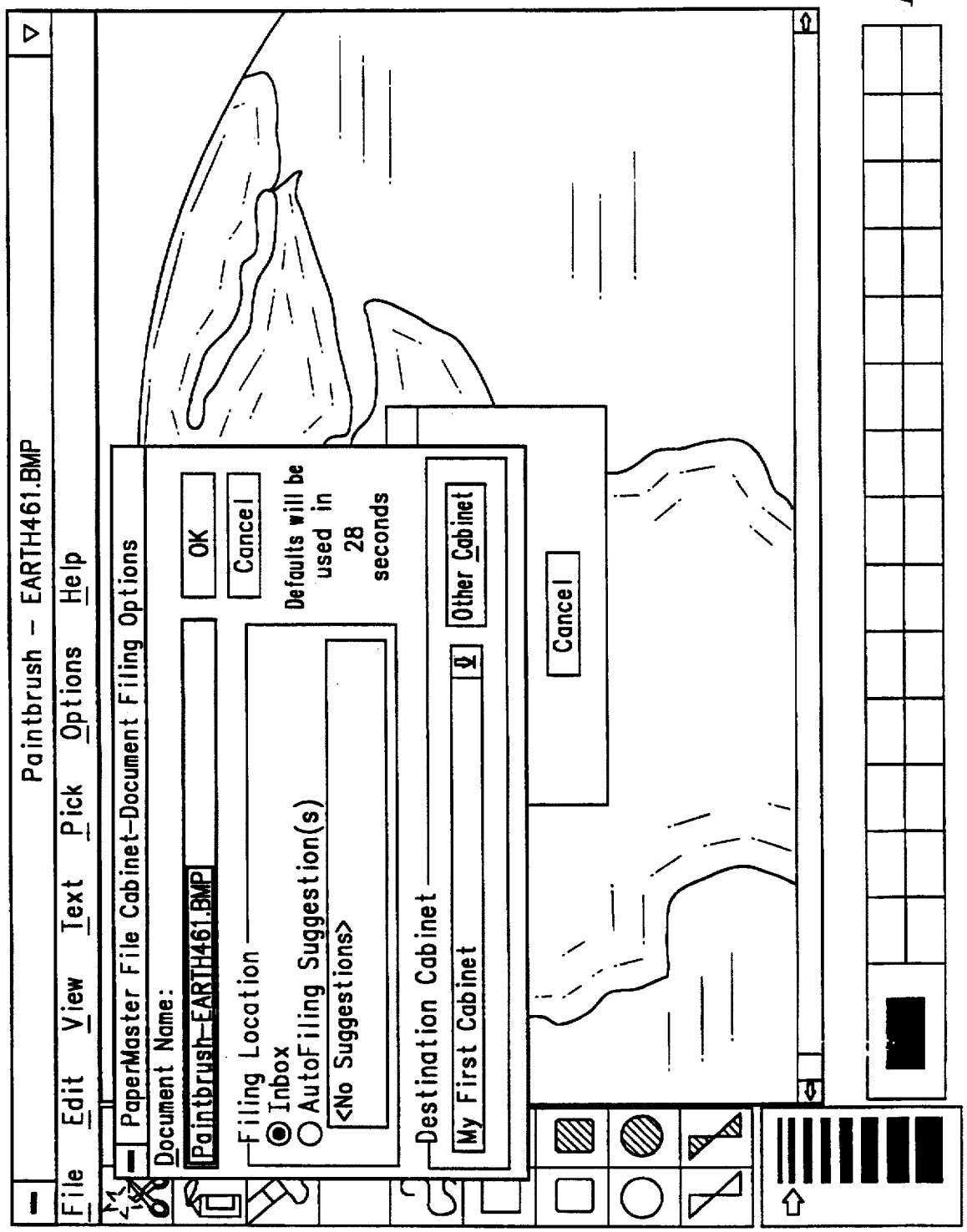
FIG. 14 illustrates storing a document from another application program into an inbox of a file cabinet.

FIG. 14 illustrates storing a document from another application program into an inbox of a file cabinet.

Figure 15B:
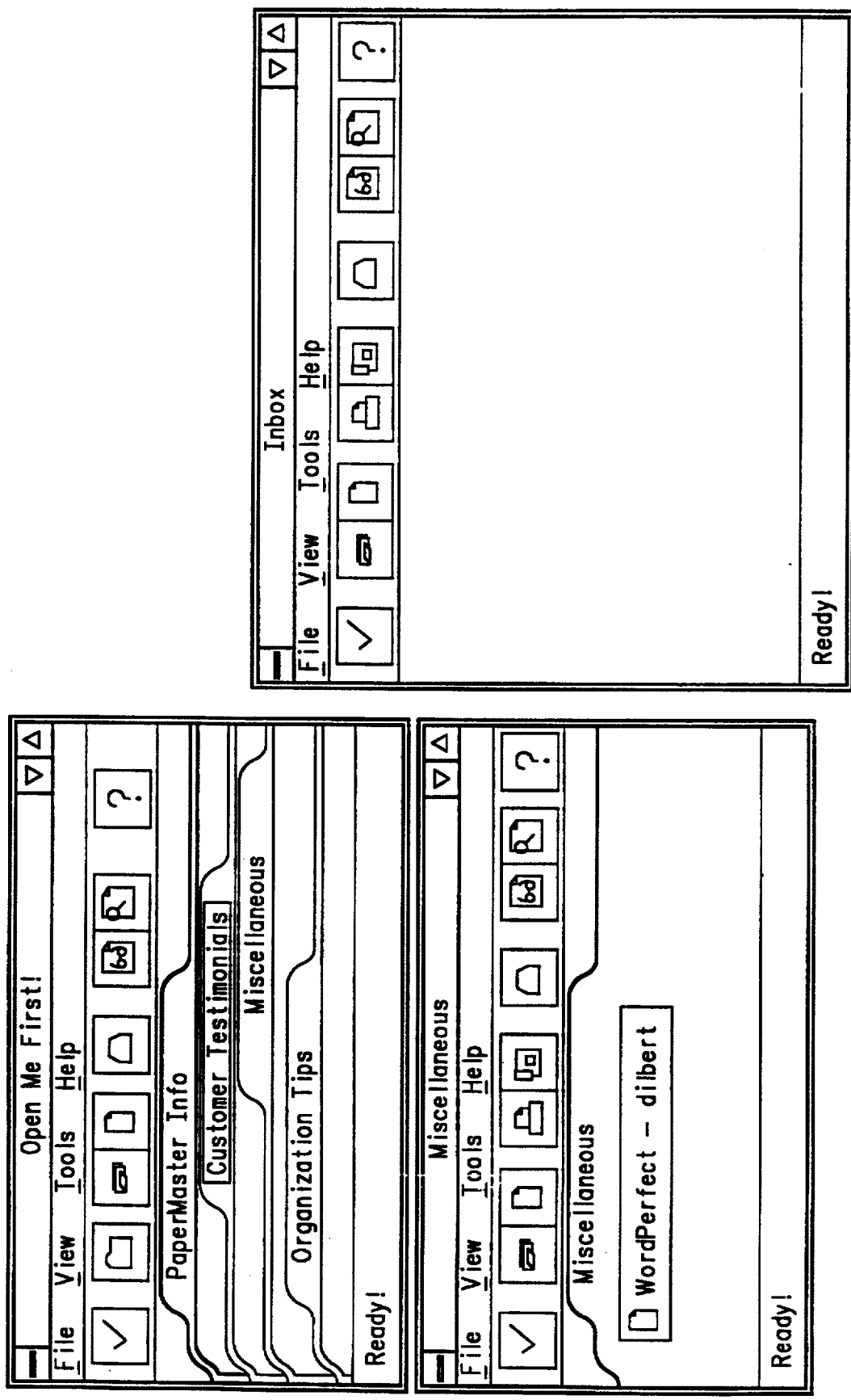

FIGS. 15A and 15B illustrate the process of moving a document from a source location to a destination location in a file cabinet. FIG. 15A includes window 1610, open file folder window 1620, and an inbox window 1630. File folder window 1610 includes file folder image 1640, and inbox window 1630 includes document icon 1650.

To move document icon 1650 from inbox window 1630 to a file folder having file folder image 1640 two methods are available, both preferably with a pointing device. Using a conventional drag and drop method, the user selects a document icon, such as document icon 1650, drags document icon 1650 until it is physically over file folder image 1640 in window 1620, and drops document icon 1650 on top of file folder image 1640. Alternatively, in FIG. 15A, since window 1620 represents the same file folder as the file folder having file folder image 1640, the user selects document icon 1650, drags document 1650 until it is physically in open file folder window 1620, and drops document icon 1650 in open file folder window 1620. The result of either of these processes is shown in FIG. 15B

Dragging and dropping of documents can also occur between file folders of the same or different file drawers and of different file cabinets. In the preferred embodiment of the present invention, when moving documents between file cabinets, the original file is maintained, while a copy is transferred to the new file cabinet.

As previously described in conjunction with FIG. 13B, FIGS. 15A and B illustrate a process the user may follow to move a document from an "inbox" of a file cabinet into a user selected file folder. The "inbox" window 1650 is preferably opened in response to the user clicking on a function button 1670.

When reviewing the contents of an inbox of a file cabinet as described above, the user may alternatively invoke the autofiling suggestions capability. Thus the user may immediately invoke the autofiling suggestions at the time the document is printed to the file cabinet, or otherwise the user may defer the autofiling suggestions until the user opens the file cabinet.

Figure 16:
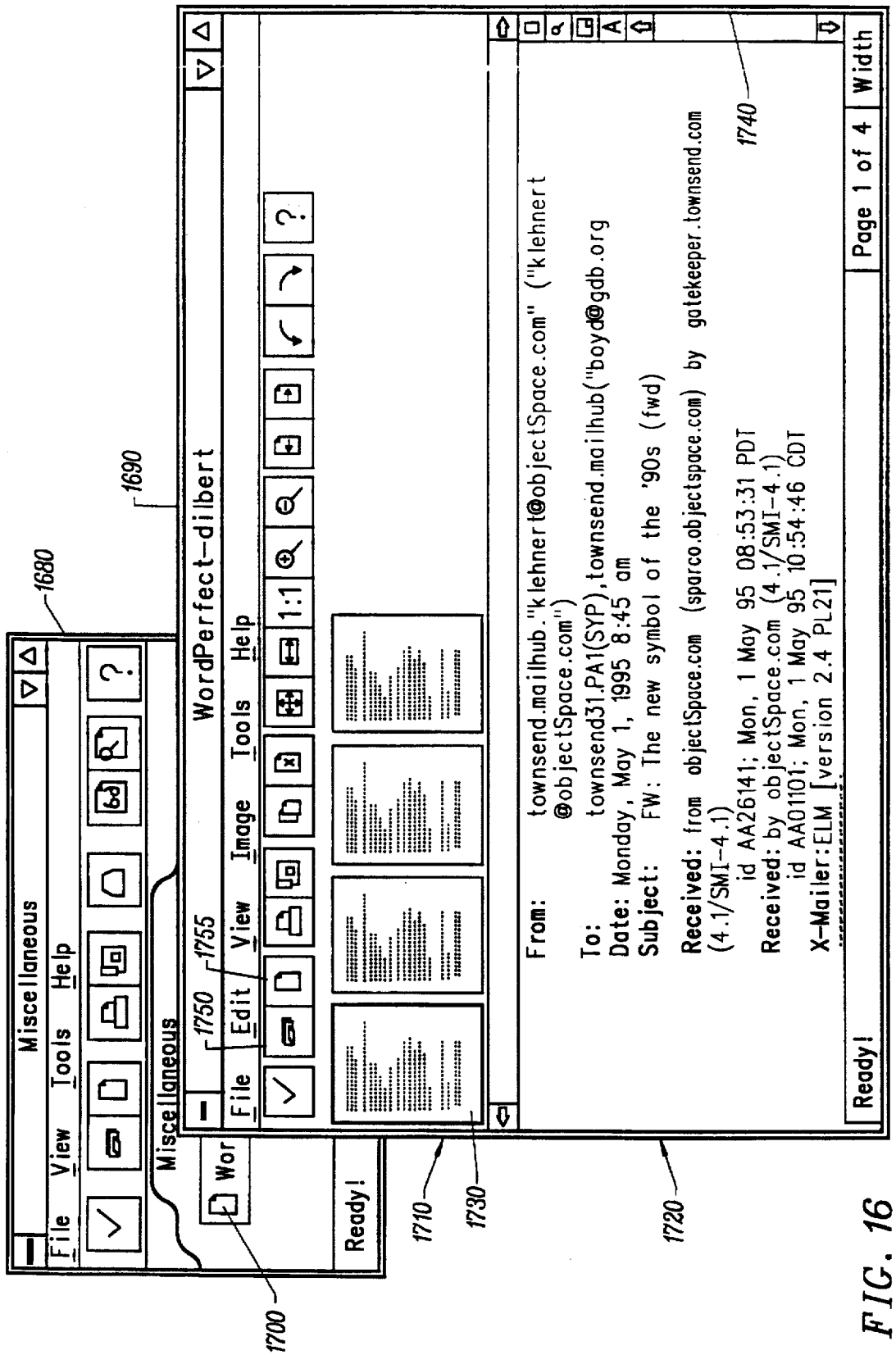
FIGS. 16 illustrate a display of a document stored within a file cabinet according to a preferred embodiment of the present invention.

FIG. 16 illustrates a display of a document stored within a file cabinet according to a preferred embodiment of the present invention. FIG. 16 includes open file folder window 1680 and document window 1690. Window 1680 includes document icon 1700. Window 1690 includes a document thumbnail region 1710 and a document view region 1720. Document thumbnail region 1710 includes thumbnails 1730, and document view region 1720 includes vertical scroll bars 1740

In the preferred embodiment, the user uses a pointing device to select a document icon for viewing. In FIG. 16, the user double-clicks a cursor on document 1700 in open file window 1680. In response to the selection of document icon 1700, window 1690 is displayed to the user. Window 1690 preferably includes a thumbnail region 1710 which gives a "thumbnail" view of the pages in the document. In FIG. 16, thumbnail view 1730 has been selected and the page of the document associated with thumbnail view 1730 is displayed in the document view region 1720. To display different parts of the document in document view region 1720, vertical scroll bars 1740 are manipulated in well known methods. The user may directly select any of the thumbnails in thumbnail region 1710, for display in document view region 1720.

As shown in many of the other figures, FIG. 16 also includes function buttons 1750 and 1755. Function button 1750 allows the user to initiate a scan of an image from a digitizing device into the current document or the current file folder. Function button 1755 allows the user to import an image or document saved in a defined format into the current document or current file folder. Defined formats may include conventional image formats such as *.GIF, *.TIF, *.PCX, *.BMP, JPEG, etc. The functionality of buttons 1750, 1755, as well as all other buttons illustrated and described are also available to the user through conventional pull-down menus.

Figure 17:
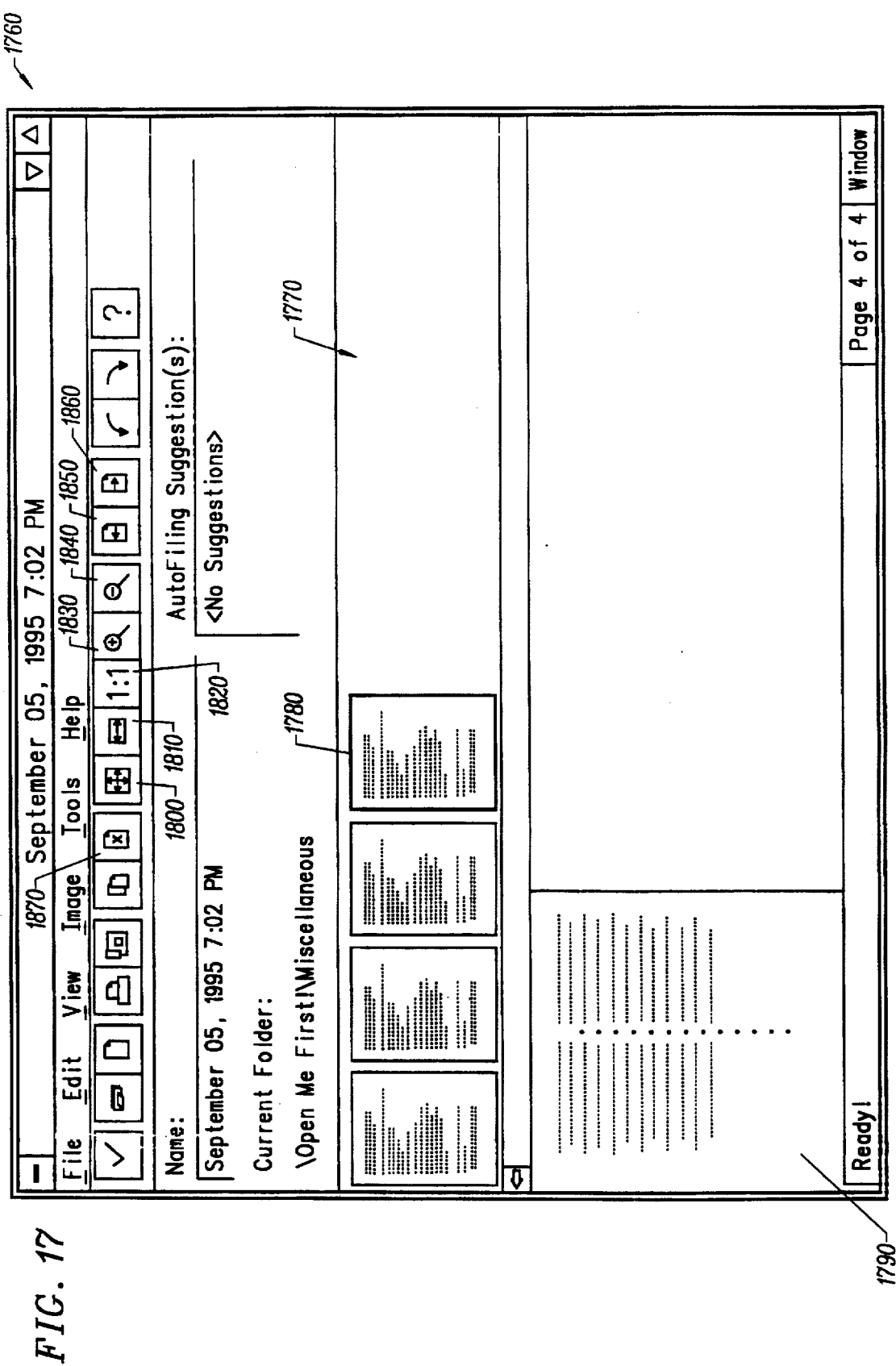
FIG. 17 illustrates a display of a scanned document according to a preferred embodiment.

FIG. 17 illustrates a display of a scanned document according to a preferred embodiment. FIG. 17 includes a scan window 1760 including a document thumbnail region 1770, a selected page 1780, a document view region 1790, and function buttons 1800-1870.

FIG. 17 illustrates that in a preferred embodiment a scanned document will appear on the display in much the same manner as a document output from an application program. Each page that is scanned is preferably displayed in thumbnail region 1770, and a selected page 1780 from the thumbnail is displayed in the document view region 1790.

Function buttons 1800-1840 appear in many of the figures including FIG. 16 and FIG. 17. When function button 1800 is selected, as illustrated in FIG. 17, the selected page 1780 of the document is displayed in its entirety in document view region 1790. FIG. 16 illustrates that when function button 1810 is selected the selected page will be displayed in the full width of the document view region. When function button 1820 is selected, the selected page of the document is displayed in the document view region at the same resolution of the scan, and when function buttons 1830 and 1840 are selected, the selected page of the document is displayed zoomed or de-zoomed, respectively, in the document view region. In a preferred embodiment, the user can also directly select a portion of a thumbnail page and in response, the selected portion is displayed in the document view region. Each thumbnail page may be preferably displayed in document view region 1790 each using different function buttons 1800-1840.

Function buttons 1850 and 1860 allow the user to view the thumbnail image to the right of the current selected page or to left of the current selected page, respectively. In FIG. 17, clicking on function button 1850 would display the third page, whereas clicking on function button 1860 would have no effect. To delete selected pages, the user selects a thumbnail image and then hits a delete key or selects function button 1870. As noted above, the functionality of the described function buttons are preferably also selectable via pull-down menus.

Figure 18:
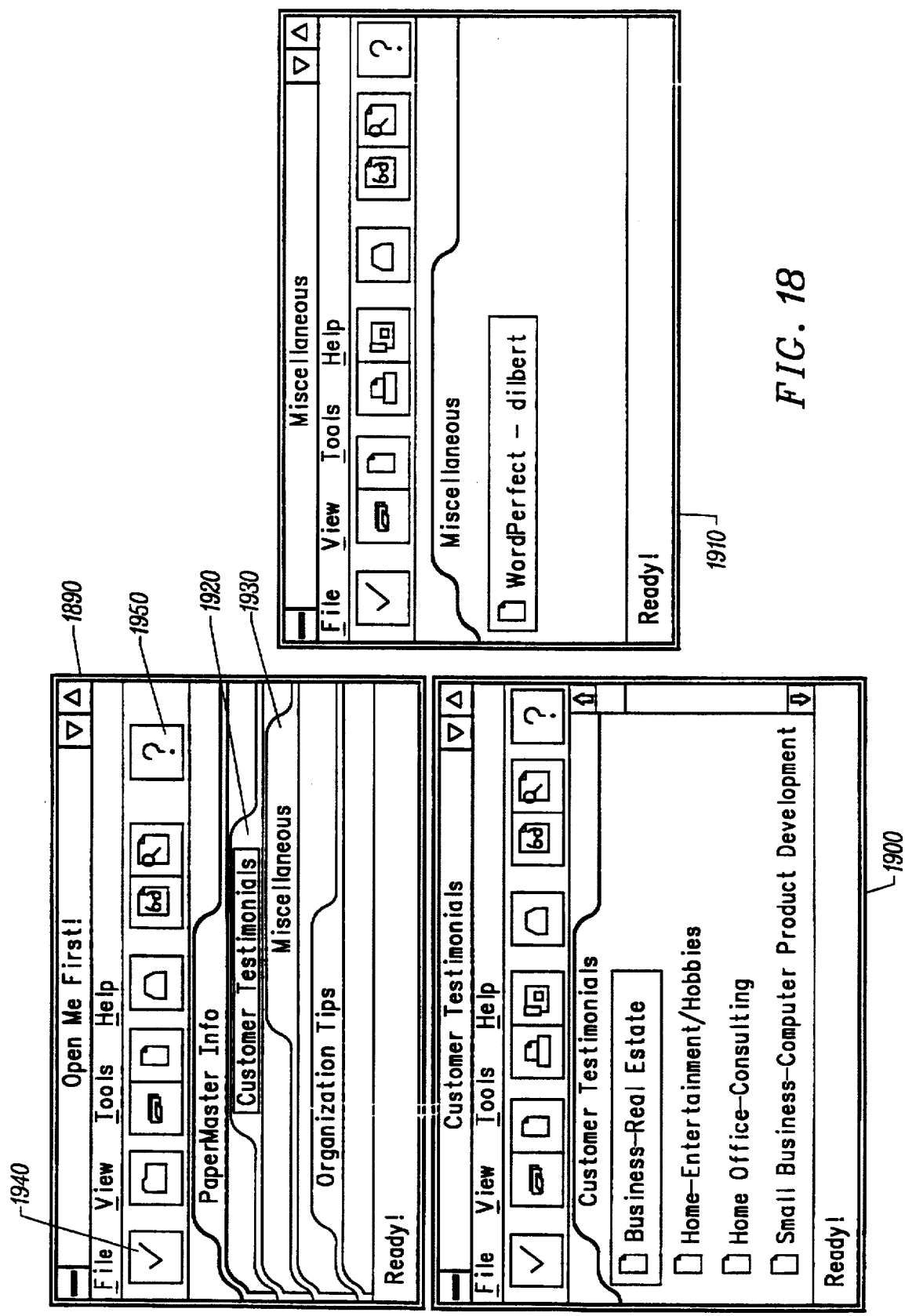
FIG. 18 illustrates that multiple file folders may be open within a file drawer.

FIG. 18 illustrates that multiple file folders may be open within a file drawer. FIG. 18 includes file folder window 1890, open folder window 1900 and open folder window 1910. File folder window 1890 includes file folder 1920 and 1930. File folder window 1890 includes function buttons 1940 and 1950.

As seen by the names of the folders in open folder window 1900 and 1910, the contents of file folder 1920 are displayed in open file folder window 1900 and the contents of file folder 1930 are displayed in open file folder window 1910.

As illustrated in the figures of the preferred embodiment of the present invention, each window includes function buttons 1940 and 1950. The user closes the current document window, open file folder window, or the file folder window by selecting function button 1940. The user obtains on-line help by selecting function button 1950.

Figure 19A:
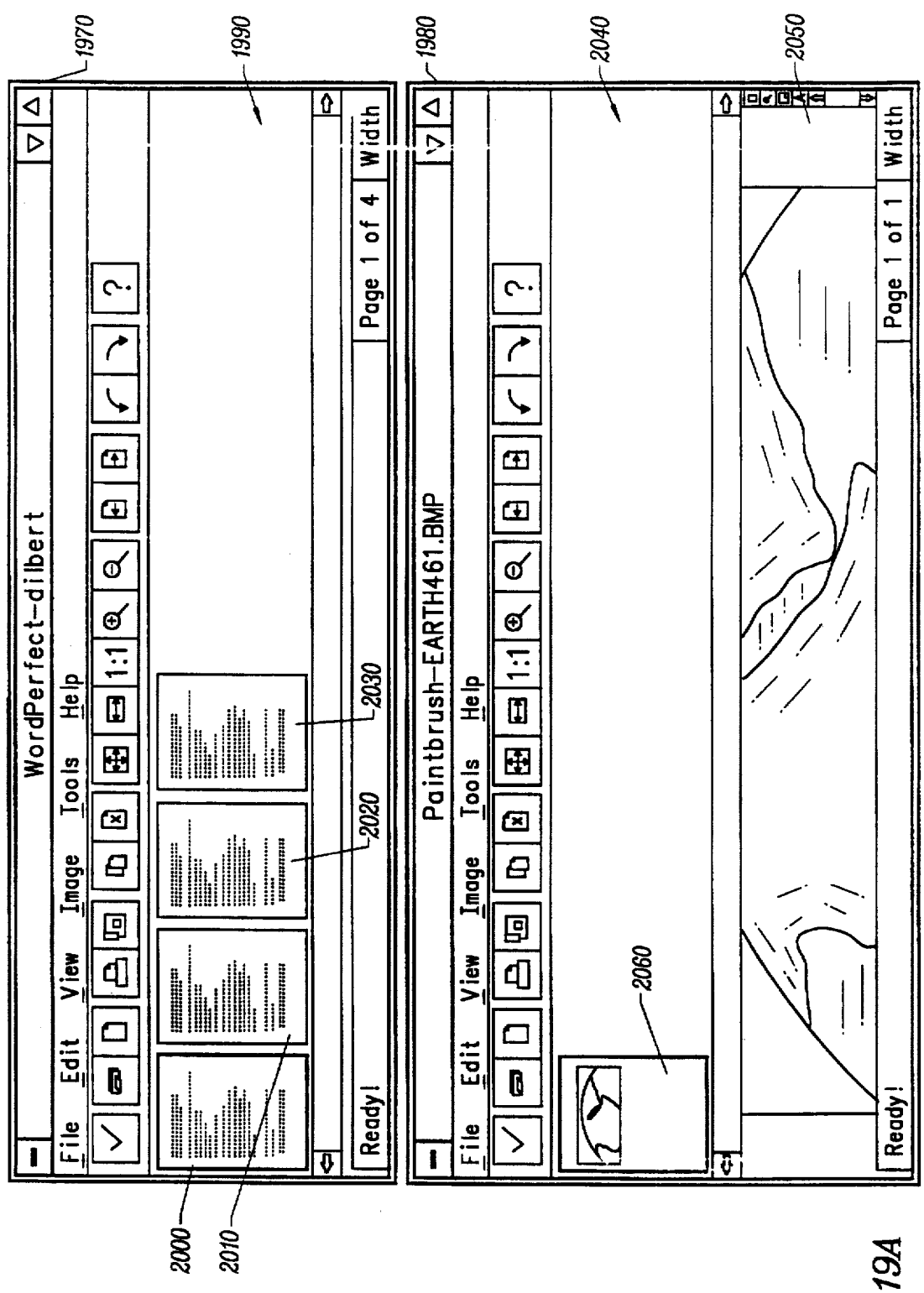
FIGS. 19A and 19B illustrate the process of copying material from one document to another document.
Figure 19B:
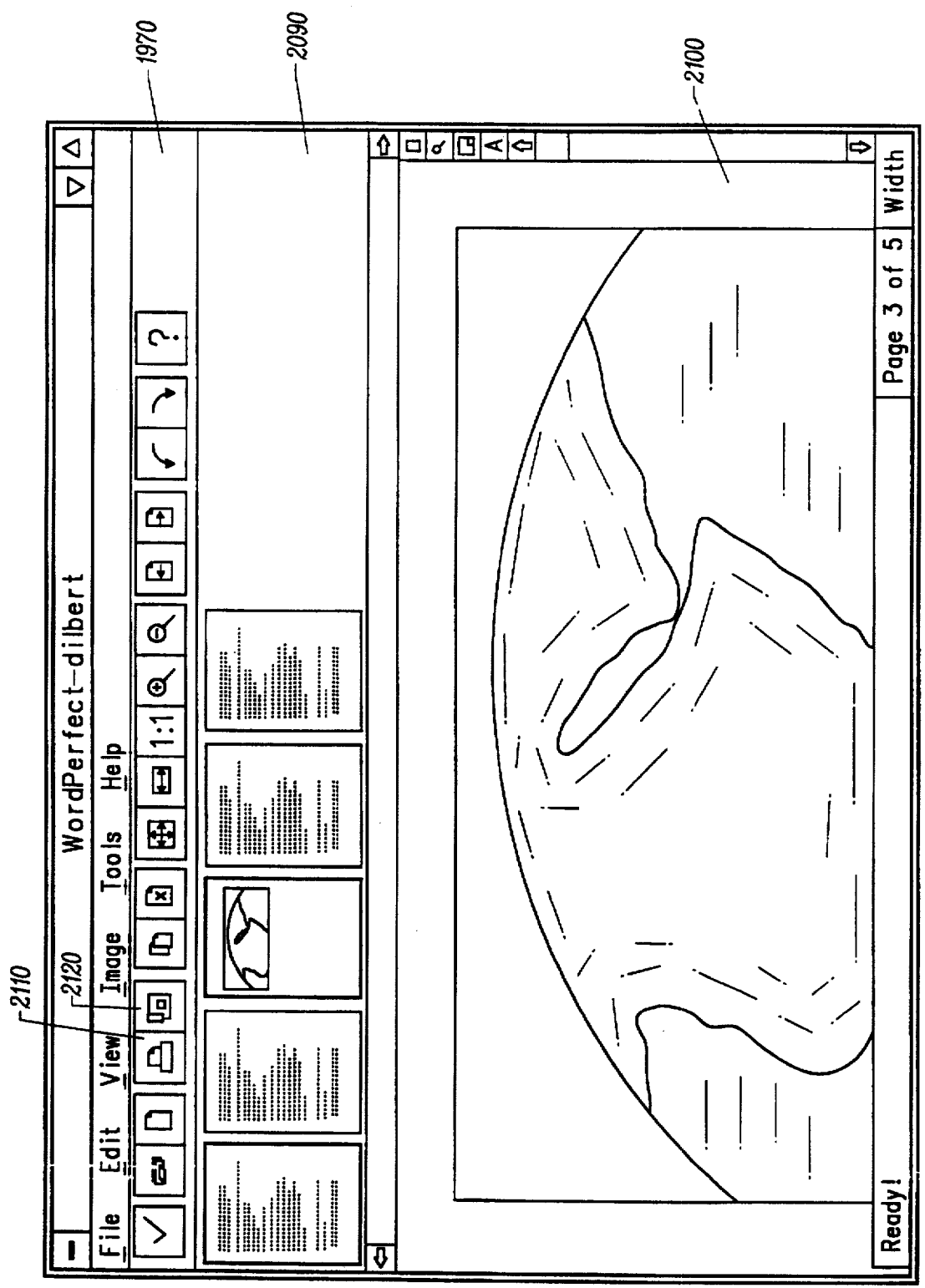

FIGS. 19A and 19B illustrate the process of copying material from one document to another document. FIG. 19A includes window 1970 and window 1980. Window 1970 includes a thumbnail region 1990 including thumbnails 2000-2030. Window 1980 includes thumbnail region 2040 including thumbnail image 2050 and document view region 2050. FIG. 19 includes window 2080 including a thumbnail region 2090 and a document view region 2100.

As illustrated in FIG. 19A, more than one document (document window 1970 and document window 1980) can be opened at one time and displayed to the user. Within each document window, thumbnail regions, for example 1990 and 2040, may be displayed.

Pages from each document, represented by the thumbnail image, are copied from one document window to another by the user using conventional drag and drop methods. For example, the user selects thumbnail image 2050 by positioning and clicking a cursor over thumbnail image 2050 in window 1980. The user then moves the cursor to a position in the document where the page is to be located, for example, between pages represented by thumbnail images 2010 and 2020. The user then releases the selection and the page represented by the thumbnail image 2050 now appears in the document shown in document window 1970. As illustrated in FIG. 19B, after the drag and drop process, document window 1970 includes the page represented by thumbnail image 2050. This page is displayed in the document view region 2100.

Function buttons 2110 and 2120 illustrated in this and in other figures allow the user to output documents to output devices. For example when the user selects function button 2110, the document currently selected is output, preferably to an attached printer. Further, when the user selects function button 2120, the document currently selected is electronically transmitted to a receiving facsimile machine using FAX software pre-installed on the user's system.

Figure 20A:
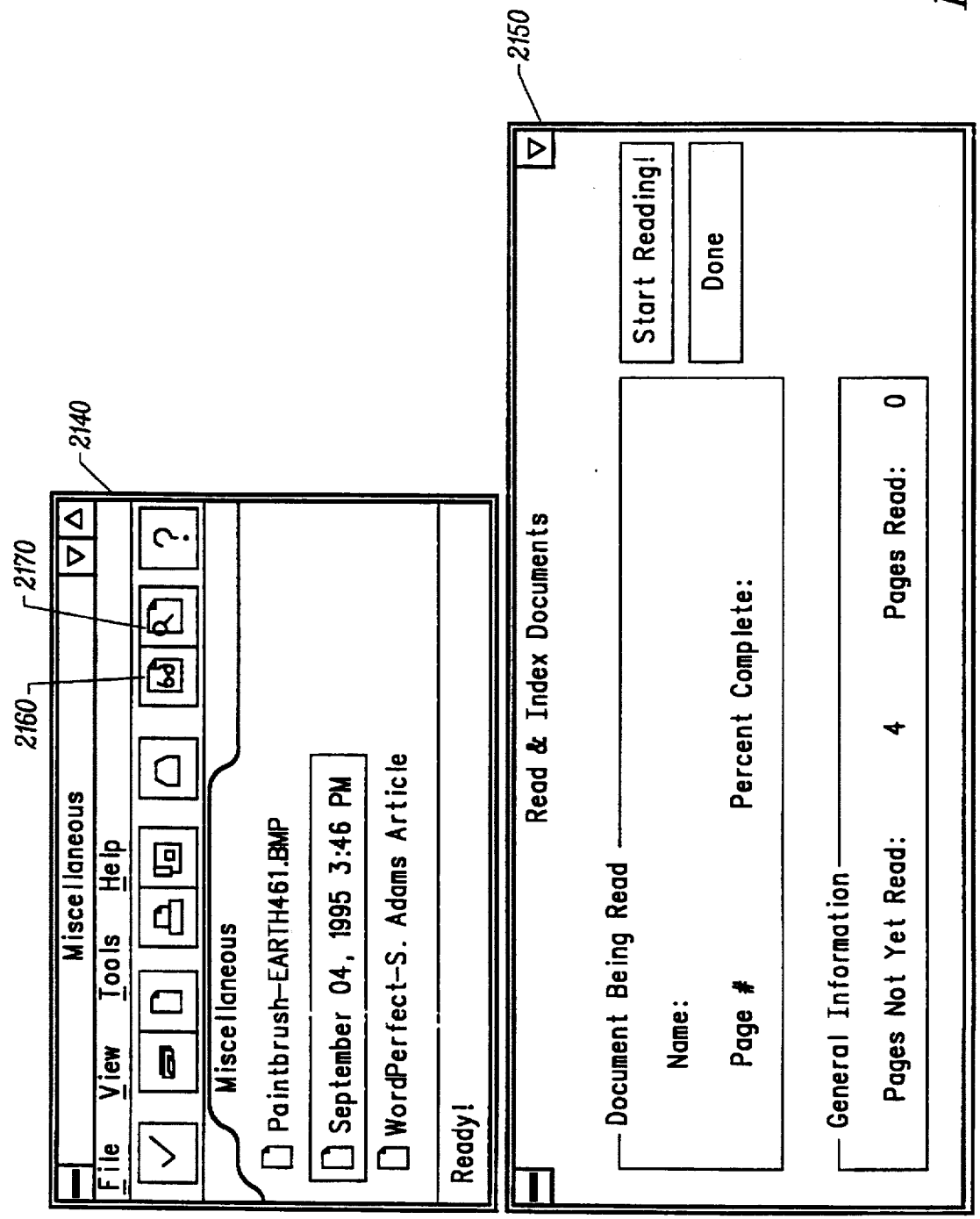
FIGS. 20A and 20B illustrate the Read & Index function and the Search function.
Figure 20B:
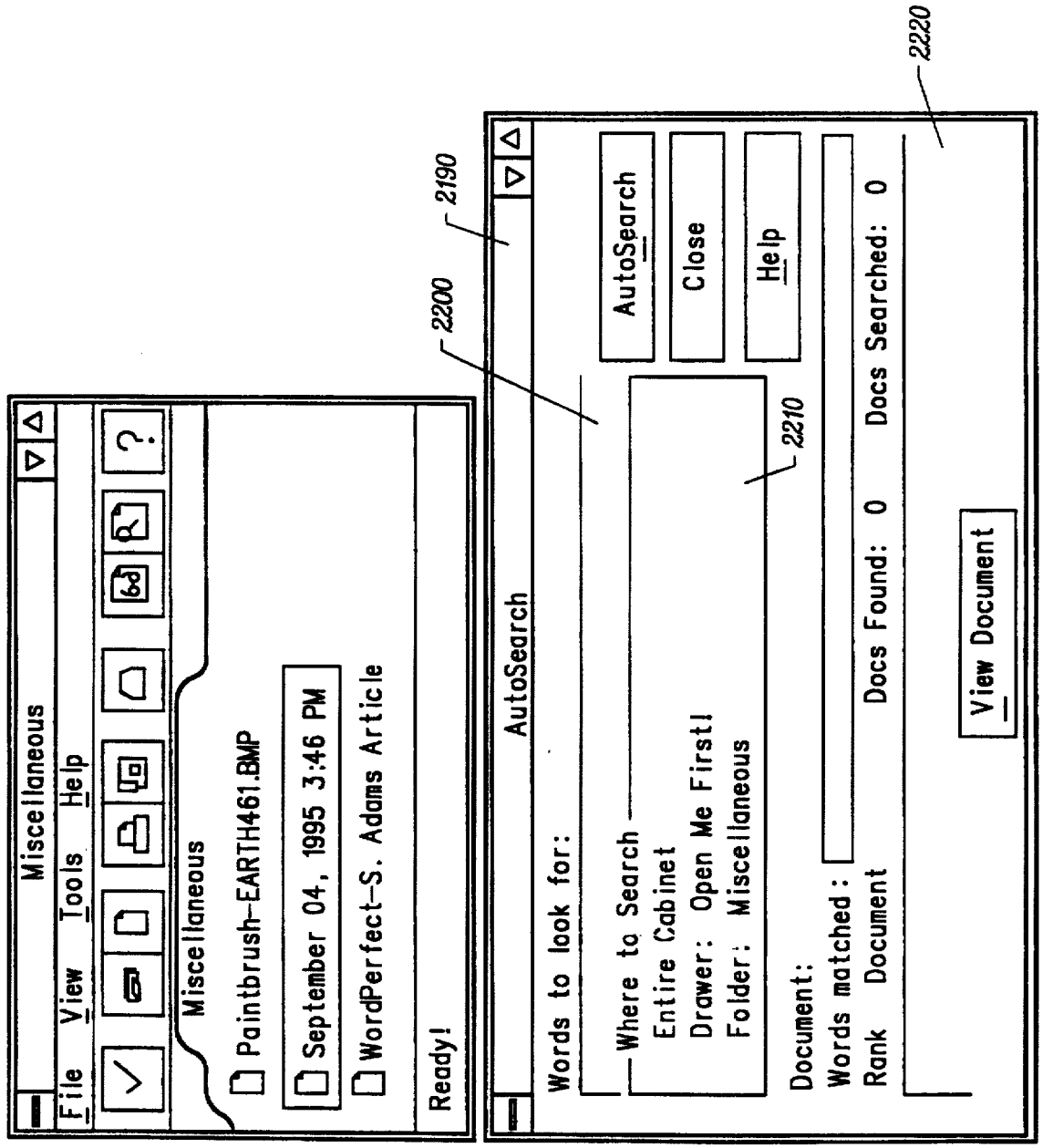

FIGS. 20A and 20B illustrate the Read & Index function and the Search function. FIG. 20A includes an open file window 2140 and a read window 2150. Window 2140 includes function buttons 2160 and 2170. FIG. 20B includes window 2190 including dialog control box 2200, search region 2210, and results region 2220.

When the user selects function button 2160, documents which have been previously scanned or imported, as described in FIGS. 16A, 16B, and 17 are "read" using commercially available optical character recognition (OCR) software such as from Calera Recognitions Systems or Pixel Translations, Inc. The OCR software is typically included with the preferred embodiment of the present invention. As illustrated in window 2150, "reading" may occur as a batch process on command. Alternatively, utilizing more efficient OCR algorithms and faster computer hardware, "reading" may occur at the time the document is scanned or imported into the file cabinet. In other embodiments, "reading" may occur as a batch process at a pre-programmed part of the day or when the computer hardware is "idle". The text produced from the OCR software is stored and indexed in the same file drawer, file folder, document, organization as appears to the user.

When the user "prints" from an application program such as a word processor, typically there is no need to invoke the OCR step, since the text is already recognized to be ASCII characters, for example.

The user can search for a term found in the document by selecting function button 2170. As illustrated in FIG. 20B, in response to the user selecting function button 2170, search window 2190 appears. Within search window 2190, the user specifies the terms to search upon in dialog control box 2200 and specifies where, within the file cabinet to search in search region 2210. The results of the search are returned to the user in the results region 2220.

Once a document has been "read" or if the document was "printed" from a word processor, the recognized characters, typically ASCII, can be "imported." In other words, in the preferred embodiment, documents that are stored can be imported to other application programs such as a word processor.

Figure 21A:
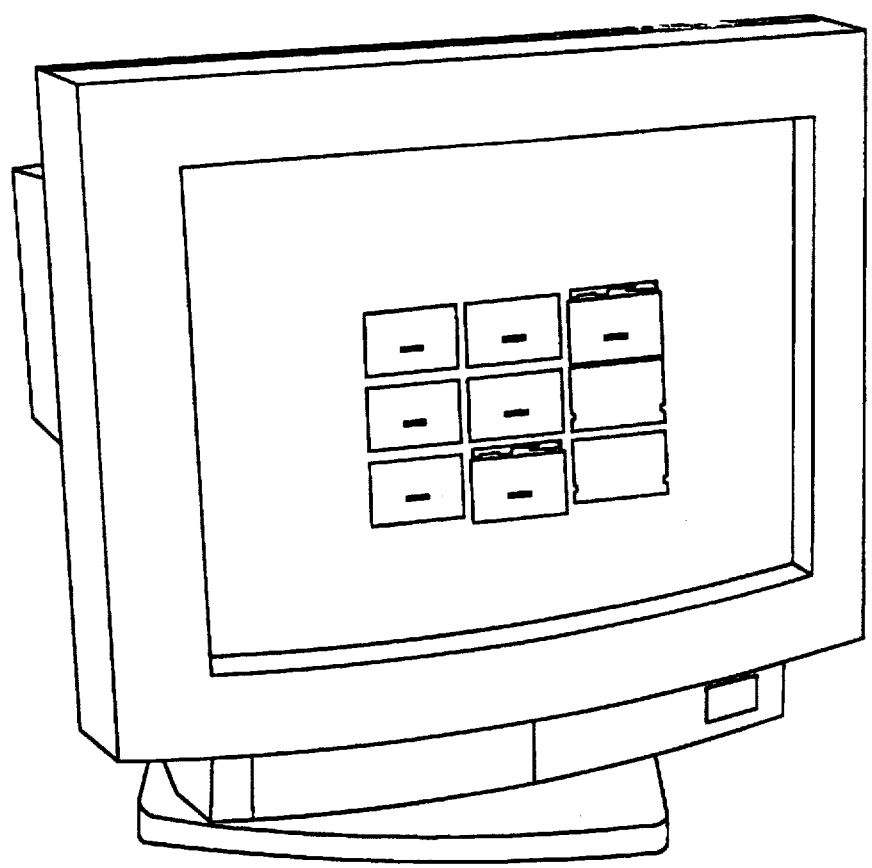
FIGS. 21A and 21B are a front view of a display screen for a computer system illustrating the design for a document management icon and a close-up view of the design.
Figure 21B:
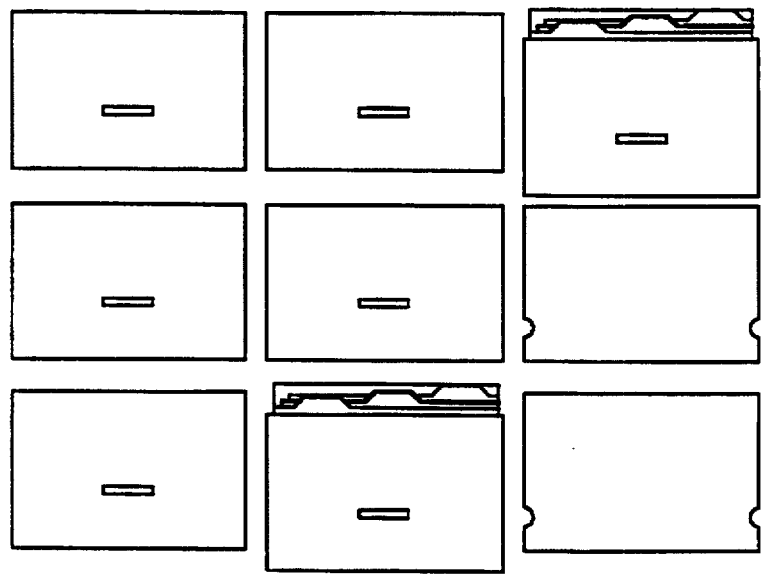

FIGS. 21A and 21B are a front view of a display screen for a computer system illustrating a design for a document management icon and a close-up view of the design.

Figure 22A:
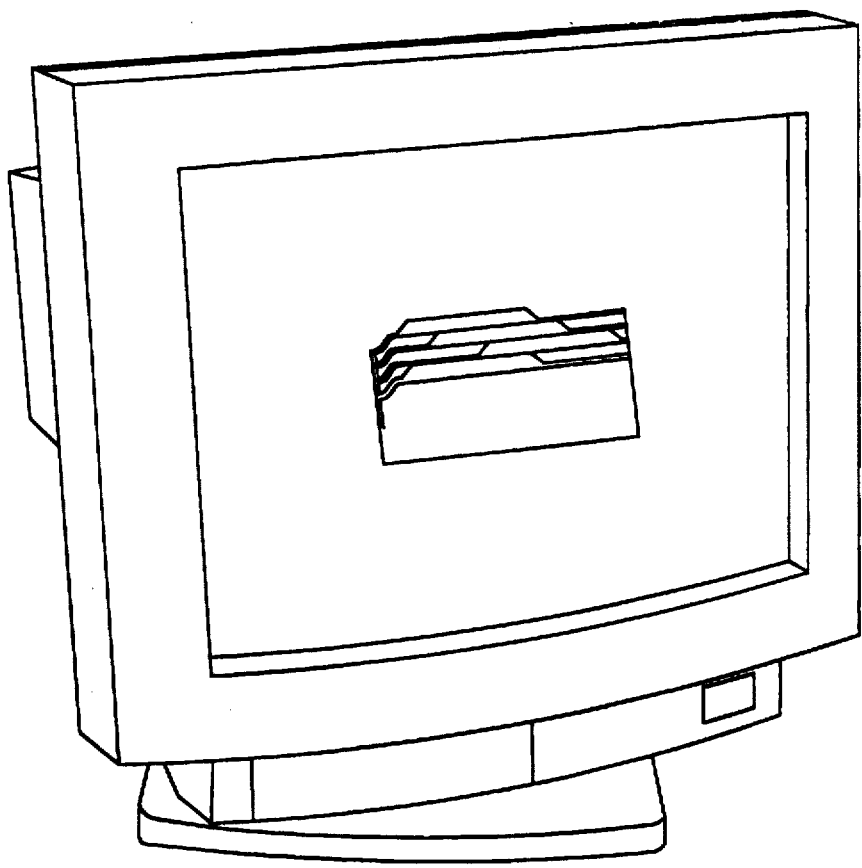
FIGS. 22A and 22B are a front view of a display screen for a computer system illustrating another design for a document management icon and a close-up view of the design.
Figure 22B:
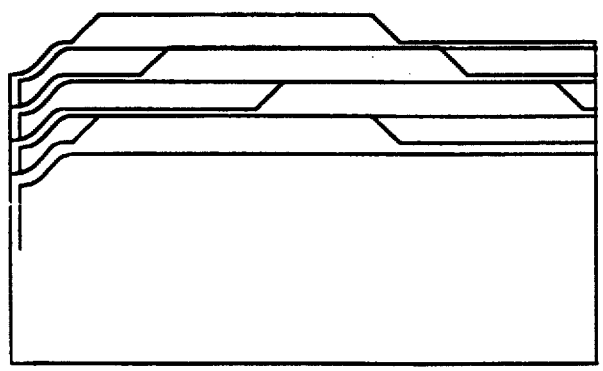

FIGS. 22A and 22B are a front view of a display screen for a computer system illustrating another design for a document management icon and a close-up view of the design.

Figure 23A:
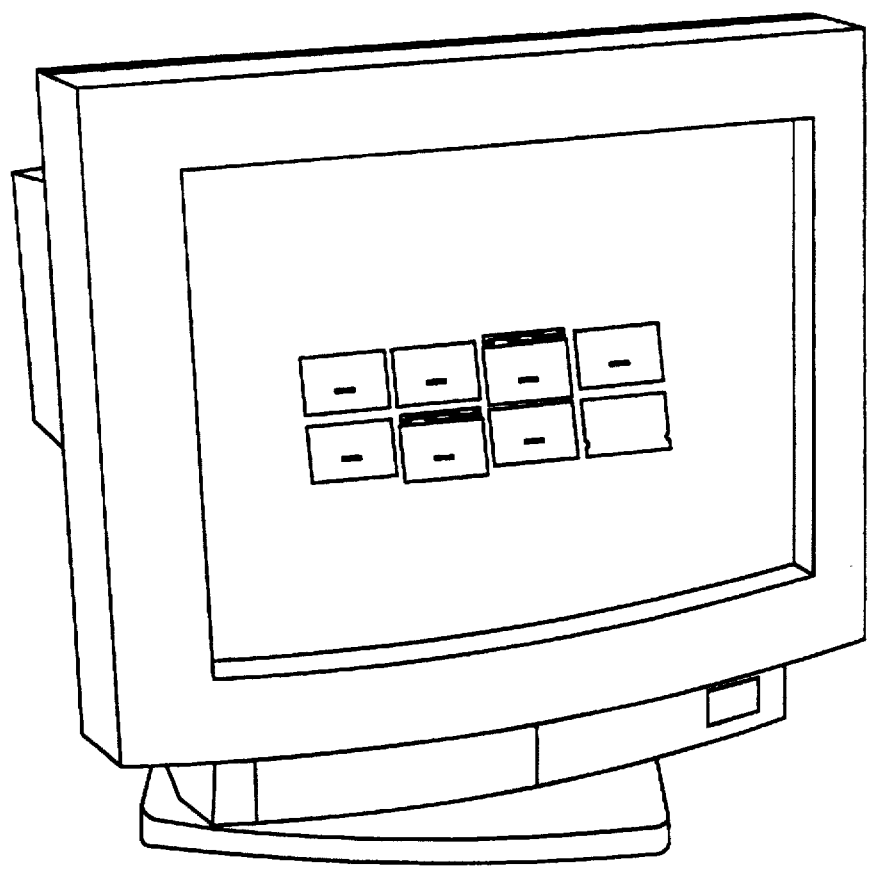
FIGS. 23A and 23B are a front view of a display screen for a computer system illustrating another design for a document management icon and a close-up view of the design.
Figure 23B:
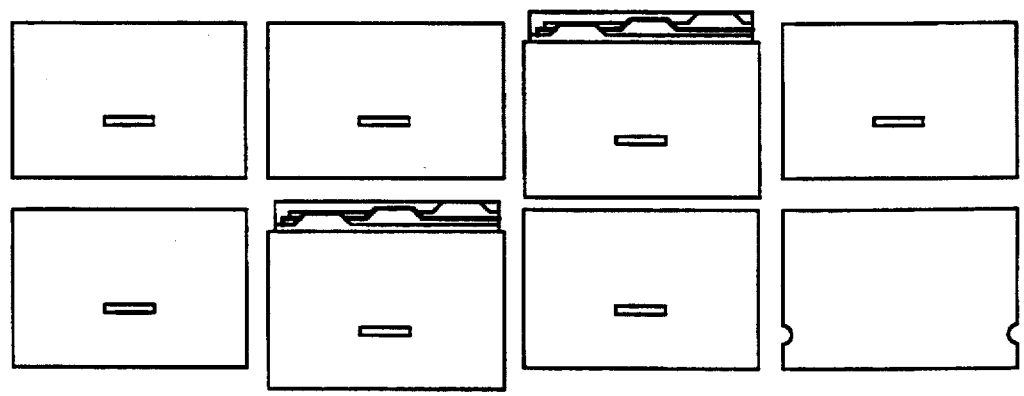

FIGS. 23A and 23B are a front view of a display screen for a computer system illustrating another design for a document management icon and a close-up view of the design.

As illustrated in FIGS. 21A–23B, the name of the file cabinet, the status bar, the menus, and the function buttons as illustrated in the previous figures need not be displayed. The name of the file cabinet, the status bar, the menus, and the function buttons may be individually selectively displayed on the display.

Any of the document management icon designs, as illustrated in FIGS. 4–12B, 15A–20-B may also appear on a display screen as illustrated in FIGS. 21A, 22A, and 23A. The icon designs above are merely illustrative and not exhaustive. For example, multiple drawers may be open at the same time, the designs (icons) appearing on the drawer may be changed, the size of the file cabinet visable on the screen may be modified, the number of folders in an open drawer may be changed, etc.

Conclusion

In the foregoing specification, the invention has been described with reference to a specific exemplary embodiments thereof Many changes or modifications are readily envisioned. For example, changing the grid structure of the file cabinet, changing the appearance and features of file drawers, file folders; adding audio effects when manipulating the file cabinet, file drawers, etc.; adding audio memos describing the contents of the file cabinets, file drawers, etc., having a document icon being generated from the first page of the document, among other changes, are included within other embodiments of the present invention.

The specification and drawings are, accordingly, to be regarded in an illustrative rather than in a restrictive sense. It will, however, be evident that various modifications and changes may be made thereunto without departing from the broader spirit and scope of the invention as set forth in the claims.

What is claimed is:

1. A method for managing documents in a computer system, the computer system including a user input device coupled to a processor, a display, and a memory; the method comprising the steps of:

printing a bit-mapped representation of a document created by an application program running on the processor to a location in the memory:

associating the bit-mapped representation with a storage structure in the memory:

displaying a file cabinet image on the display, the file cabinet image including a plurality of file drawer images;

selecting a file drawer image from the plurality of file drawer images in response to a first signal from the user input device;

displaying a plurality of file folder images on the display associated with the file drawer image on the display;

selecting a file folder image from the plurality of the file folder images in response to a second signal from the user input device, the file folder image associated with the storage structure in the memory, and the file folder image having a file folder name:

displaying an icon representing the bit-mapped representation on the display;

selecting the icon in response to a third signal from the user input device; and displaying the bit-mapped representation of the document.

2. The method of claim 1, wherein the file cabinet image also includes a plurality of drawer opening images.

3. The method of claim 2, further comprising the steps of:

selecting a second file drawer image from the plurality of file drawer images in response to a fifth signal from the user input device, the second file drawer image located at a first location on the file cabinet image;

selecting a drawer opening image from the plurality of drawer opening images in response to a sixth signal from the user input device, the drawer opening image located at a second location on the file cabinet image;

displaying the second file drawer image at the second location on the file cabinet image; and displaying the drawer opening image at the first location on the cabinet image.

4. The method of claim 1, further comprising the steps of:

selecting a second file drawer image from the plurality of file drawer images in response to a fourth signal from the user input device, the second file drawer image located at a location on the file cabinet image;

defining a password associated with the second file drawer image; thereafter displaying a modified second file drawer image at the location on the file cabinet image, the modified second file drawer image indicating password protection of contents associated with the second file drawer image.

5. The method of claim 1, wherein each of the plurality of file drawer images have icons associated therewith, the method further comprising the step of:

displaying the icons associated with each of the plurality of file drawer images on top of associated file drawer images on the display.

6. The method of claim 2, wherein the plurality of file drawers images and the plurality of drawer openings images are arranged in a grid pattern on the display.

7. The method of claim 1, further comprising the steps of:

displaying a second file cabinet image on the display, the second file cabinet image including second plurality of file drawer images and a plurality of drawer opening images;

selecting a file drawer image from the second plurality of file drawer images, in response to a fourth from the user input device, and displaying a second plurality of file folder images associated with the second file drawer image on the display.

8. The method of claim 5, wherein the icons associated with each of the plurality of file drawer images are user selectable.

9. The method of claim 1, wherein the step of associating the bit-mapped representation with a storage structure in the memory comprises the step of:

displaying the file folder name from the plurality of file folder names on the display as a suggested association in response to the bit-mapped image; and associating the storage structure in the memory with the suggested file folder image in response to the suggested association.

10. The method of claim 1, further comprising the step of:

converting the bit-mapped document into a format used by another application program.

11. The method of claim 1, wherein the step of displaying the icon further comprises the step of:

displaying a thumbnail image of a page in the document on the display.

12. A method for managing documents in a computer system, the computer system including a user input device coupled to a processor, a display, a memory having a plurality of documents, and a document input device, the method comprising the steps of:

creating an electronic representation of a document using the document input device;

determining a file folder name from a plurality of file folder names as a suggested association for the electronic representation in response to the electronic representation, the file folder name associated with a file folder image;

displaying the file folder name on the display;

associating the electronic representation with the file folder name in response to a first input signal from the user input device;

displaying a file cabinet image on the display, the file cabinet image including a plurality of file drawer images;

selecting a file drawer image from the plurality of file drawer images in response to a second signal from the user input device;

displaying a plurality of file folder images associated with the file drawer image on the display, the plurality including the file folder image;

selecting the file folder image in response to a third signal from the user input device, and displaying the electronic representation of the document on the display .

13. An apparatus for managing documents in a computer system, the computer system including a user input device coupled to a processor, and a memory having a plurality of documents, the apparatus further comprising;

a display;

a machine configured to print a bit-mapped representation of a document created, by an application program running on the processor to a location in the memory;

a machine configured to associate the bit-mapped representation with a storage location in the memory a machine configured to display a file cabinet image on the display, the file cabinet image including a plurality of file drawer images;

a machine configured to select a file drawer image from the plurality of file drawer images in response to a first signal from the user input device;

a machine configured to display a plurality of file folder images associated with the file drawer image on the display a machine configured to select a file folder image from the plurality of file folder images in response to a second signal from the user input device the file folder image associated with the storage location in the memory; and a machine configured to display the bit-mapped representation on the display 14. A computer program for managing documents in a computer system, the computer system including a user input device coupled to a processor, a display, and a memory having a plurality of documents, the computer program comprising:

code that prints a bit-mapped representation of a document created by an application program running on the processor to the memory;

code that associates the bit-mapped representation with a storage location in the memory code that displays a file cabinet image on the display, the file cabinet image including a plurality of file drawer images;

code that enables the user to select a file drawer image from the plurality of file drawer images in response to a first signal from the user input device; and code that displays a plurality of file folder images associated with the file drawer image on the display;

code that enables the user to select a file folder image from the plurality of file folder images in response to a second signal from the user input device the file folder image associated with the storage location in the memory, and code that displays the bit-mapped representation on the display wherein the codes are stored on a tangible medium.

15. A computer system for managing documents, the computer system including a user input device coupled to a processor, a display, a memory having a plurality of documents, and a document input device, the computer system further comprising:

a machine configured to create an electronic representation of a physical document using the document input device;

a machine configured to determine a file folder name from a plurality of file folder names as a suggested association for the electronic representation in response to the electronic representation the file folder name associated with a file folder image:

a machine configured to display the file folder name on the display:

a machine configured to associate the electronic representation with the file folder name in response to a first input signal from the user input device:

a machine configured to display a file cabinet image on the display, the file cabinet image including a plurality of file drawer images;

a machine configured to select a file drawer image from the plurality of file drawer images in response to a second signal from the user input device;

a machine configured to display a plurality of file folder images associated with the file drawer image on the display;

a machine configured to select the file folder image in response to a third signal from the user input device: and a machine configured to display the electronic representation of the document on the display.

16. A computer program for managing documents in a computer system, the computer system including a user input device coupled to a processor, a display, a memory having a plurality of documents, and a document input device, the computer program comprising:

code for creating an electronic representation of a physical document using the document input device;

code for displaying a file folder name on the display as a suggested association for the electronic representation in response to the electronic representation:

code for associating the electronic representation with the file folder name in response to a first input signal from the user input device;

code for displaying a file cabinet image on the display, the file cabinet image including a plurality of file drawer images;

code for selecting a file drawer image from the plurality of file drawer images in response to a first plurality of signals from the user input device;

code for displaying a plurality of file folder images associated with the file drawer image on the display;

code for selecting the file folder image in response to a third signal from the user input device: and code for displaying the electronic representation of the document on the display, wherein the codes are stored on a tangible medium.

* * * * *